(12) United States Patent
Jensen et al.

(10) Patent No.: US 9,105,294 B2
(45) Date of Patent: Aug. 11, 2015

(54) COMPOSITE MAGNETIC RECORDING MEDIA

(75) Inventors: Tryg R. Jensen, Roseville, MN (US); Adam A. Brodd, Minneapolis, MN (US); C. Thomas Jennings, Woodbury, MN (US); David J. Owen, Woodbury, MN (US)

(73) Assignee: SONY CORPORATION, Tokyo (JP)

( * ) Notice: Subject to any disclaimer, the term of this patent is extended or adjusted under 35 U.S.C. 154(b) by 69 days.

(21) Appl. No.: 12/725,369

(22) Filed: Mar. 16, 2010

(65) Prior Publication Data

US 2011/0229739 A1     Sep. 22, 2011

(51) Int. Cl.
G11B 5/66    (2006.01)
G11B 5/738   (2006.01)
G11B 5/708   (2006.01)
G11B 5/706   (2006.01)
G11B 5/70    (2006.01)
G11B 5/73    (2006.01)
G11B 5/714   (2006.01)

(52) U.S. Cl.
CPC  *G11B 5/738* (2013.01); *G11B 5/70* (2013.01); *G11B 5/7085* (2013.01); *G11B 5/70626* (2013.01); *G11B 5/7305* (2013.01); *G11B 5/714* (2013.01)

(58) Field of Classification Search
None
See application file for complete search history.

(56) References Cited

U.S. PATENT DOCUMENTS

| | | | |
|---|---|---|---|
| 3,767,464 A | 10/1973 | Akashi et al. | |
| 3,959,553 A | 5/1976 | Hartmann et al. | |
| 4,425,401 A | 1/1984 | Ido et al. | |
| 4,548,801 A | 10/1985 | Nagal et al. | |
| 4,557,947 A | 12/1985 | Deimling et al. | |
| 4,604,293 A | 8/1986 | Shirahata et al. | |
| 4,666,769 A | 5/1987 | Miyata et al. | |
| 4,671,995 A | 6/1987 | Sekiya et al. | |
| 4,746,558 A | 5/1988 | Shimozawa et al. | |
| 4,842,942 A | 6/1989 | Yatsuka et al. | |
| 5,336,561 A | 8/1994 | Hashimoto et al. | |
| 5,492,775 A | 2/1996 | Ahlert et al. | |
| 5,503,922 A | 4/1996 | Shimasaki et al. | |
| 5,567,523 A | 10/1996 | Rosenblum et al. | |
| 6,063,489 A * | 5/2000 | Kobayashi et al. | 428/328 |
| 6,627,293 B1 * | 9/2003 | Inoue et al. | 428/141 |
| 7,186,472 B2 * | 3/2007 | Zinbo | 428/844.3 |
| 2004/0005479 A1 | 1/2004 | Kitamura et al. | |

(Continued)

OTHER PUBLICATIONS

Standard ECMA-319, "Data Interchange on 12, 7 mm 384-Track Magnetic Tape Cartridges—Ultrium-1 Format," Jun. 2001, 146 pp.

(Continued)

*Primary Examiner* — Holly Rickman
(74) *Attorney, Agent, or Firm* — K&L Gates LLP

(57) ABSTRACT

Composite magnetic recording media are described. A composite structure is a structure that is formed of multiple components. For example, a composite magnetic recording medium may include a substrate, an underlayer formed over the substrate, the underlayer defining a coating surface, and a magnetic layer formed over the coating surface of the underlayer. Composite magnetic recording media constructed according to the materials and techniques disclosed may provide dimensional flexibility while exhibiting improved physical or electromagnetic characteristics. In some examples, dimensional flexibility may be achieved by pairing a substrate greater than or equal to approximately 4000 nanometers thick with an underlayer less than or equal to approximately 890 nanometers thick.

20 Claims, 6 Drawing Sheets

(56) References Cited

U.S. PATENT DOCUMENTS

| | | | |
|---|---|---|---|
| 2004/0096703 A1 | 5/2004 | Noguchi et al. |
| 2004/0151946 A1 | 8/2004 | Kato et al. |
| 2004/0207955 A1 | 10/2004 | Seki et al. |
| 2004/0209121 A1 | 10/2004 | Yajima et al. |
| 2008/0070066 A1 | 3/2008 | Mikamo et al. |
| 2009/0046396 A1 | 2/2009 | Nagata et al. |
| 2009/0087684 A1 | 4/2009 | Omura et al. |
| 2009/0092857 A1 | 4/2009 | Matsumoto et al. |
| 2009/0162701 A1 | 6/2009 | Jensen et al. |
| 2009/0174969 A1 | 7/2009 | Tada et al. |

OTHER PUBLICATIONS

U.S. Appl. No. 12/753,718, by David C. Lowery, filed Apr. 2, 2010.
U.S. Appl. No. 12/753,730, by David C. Lowery, filed Apr. 2, 2010.
U.S. Appl. No. 12/753,738, by David C. Lowery, filed Apr. 2, 2010.
Matsumoto et al. "High Recording Density Tape Using Fine Barium-ferrite Particles with Improved Thermal Stability," presented in nearly final form at the 2009 Intermag Conference, May 2009, published later in journal, IEEE Transactions of Magnetics, vol. 46(5), May 2010 (6 pp.).
Shimizu et al. "Particle Orientation Effects of Barium Ferrite Particulate Media", presented at the MMM-Intermag Conference, Jan. 2010, published later in journal, IEEE Transactions on Magnetics, vol. (46(5): 1607-1609, Jun. 2010.
Harasawa et al. "Barium-Ferrite Particulate Media for High-Recording-Density Tape Storage Systems", presented at the MMM-Intermag Conference, Jan. 2010, published later in journal, IEEE Transactions on Magnetics, vol. 46 (6): 1894-1897, Jun. 2010.
Berman et al. "6.7 Gb/in$^2$ Recording Areal Density of Barium Ferrite Tape", IEEE Transactions on Magnetics, vol. 43, No. 8, Aug. 2007 (7 pp.).
Office Action from U.S. Appl. No. 12/753,718, dated Mar. 15, 2012, 8 pp.
Office Action from U.S. Appl. No. 12/753,738, dated Jun. 8, 2012, 15 pp.

* cited by examiner

COMPOSITE MAGNETIC RECORDING MEDIA

TECHNICAL FIELD

The invention relates to magnetic recording media and, in particular, magnetic recording media that include a composite structure.

BACKGROUND

Magnetic recording media are widely used in a variety of data storage applications. They include magnetic hard drives, magnetic diskettes, magnetic tapes, magnetic tape cartridges, and the like. Magnetic recording media generally store data using ferromagnetic principles. For example, magnetic recording media generally have a series of magnetically oriented discrete domains with one of two magnetic directions representing a value of "0" or "1". The magnetically oriented domains may be aligned on data tracks that divide the magnetic recording medium.

Larger data storage demands and technological advancements have led to increased data storage densities. Magnetic media are designed to accommodate a high number of tracks and a high number of magnetizations along the length of each track to meet the storage density demands. Techniques have further been developed to improve the quality and reliability of magnetic media. For example, new and improved materials and coatings have been developed over the years in an effort to improve the quality and performance of magnetic media. Material tolerances and process control parameters have also improved for magnetic recording media.

Magnetic recording media generally include a magnetic layer that is formed onto a non-magnetic substrate. One or more intermediate layers, variously referred to as carrier layers, sublayers, or underlayers may reside between the magnetic layer and the substrate. A backing layer may be further attached to the substrate to provide mechanical and performance benefits. Together the various layers create a composite structure.

SUMMARY

In general, this disclosure relates to magnetic recording media that define a composite structure. A composite structure is a structure that is formed of multiple components. For example, a composite magnetic recording medium may include a multilayer structure. The layers may include a magnetic layer that is formed onto a non-magnetic substrate. An intermediate underlayer may be formed over the non-magnetic substrate, and a magnetic layer may then be formed over the underlayer. Further, a backing layer may be formed adjacent a portion of the substrate. Together, the various layers form a magnetic recording medium that facilitates subsequent data writing operations.

A magnetic recording medium, together with its constituent layers, defines a thickness. The thickness of the magnetic recording medium may be immaterial for some applications, such as when data reading and writing hardware are designed around a predesigned magnetic recording medium. In other cases, however, the overall thickness of a magnetic recording medium is a material parameter. For example, recording hardware may require magnetic media with specific dimensions in order to operate. Also, it may be advantageous to have thin magnetic media that provides significant data storage capacity on, for example, a wound roll. In further cases, industry standards, such as standards promulgated by the Linear Tape-Open (LTO) Consortium impose constraints on magnetic recording medium dimensions.

Controlling the thickness of a composite magnetic recording medium while achieving acceptable data storage density and quality parameters, in accordance with this disclosure, can offer improved magnetic media while still satisfying external standards imposed on magnetic recording media.

As an example, a magnetic recording medium may include a substrate, an underlayer formed over the substrate, the underlayer defining a coating surface, and a magnetic layer formed over the coating surface of the underlayer. The substrate may define an average thickness greater than or equal to approximately 4000 nanometers, and the underlayer may define an average thickness less than or equal to approximately 890 nanometers. In some examples, the underlayer may include carbon black and a non-magnetic metal oxide pigment, and a ratio of carbon black to non-magnetic metal oxide pigment is greater than or equal to approximately 0.12. In some examples, the magnetic layer comprises an activator and a polyhydric binder that includes three or more hydroxyl functional groups.

As another example, a magnetic recording medium may include a substrate, an underlayer formed over the substrate, wherein the underlayer defines a coating surface, and the underlayer defines an average thickness less than or equal to approximately 890 nanometers, and a magnetic layer formed over the coating surface of the underlayer. The magnetic recording medium may further exhibit a two-pass abrasivity loss less than or equal to approximately 2.5 micrometers. In some examples, a compressibility ratio of the underlayer is greater than or equal to approximately 14 percent. In some examples, the substrate defines an average thickness between approximately 4750 nanometers and approximately 5250 nanometers, and the average thickness of the underlayer is greater than or equal to approximately 710 nanometers.

As another example, a magnetic recording medium may include a substrate that defines an average thickness between approximately 4500 nanometers and approximately 5500 nanometers, an underlayer deposited directly on the substrate, wherein the underlayer defines a coating surface, and the underlayer defines an average thickness between approximately 710 nanometers and 815 nanometers, and a magnetic layer that includes a plurality of metal particles deposited directly on the coating layer of the underlayer. Further, the substrate, the underlayer, and the magnetic layer may combine to form a magnetic tape, and an average compressibility ratio of the underlayer may be greater than or equal to approximately 14 percent.

The details of one or more examples of the invention are set forth in the accompanying drawings and the description below. Other features, objects, and advantages of the disclosure will be apparent from the description and drawings, and from the claims.

DETAILED DESCRIPTION

In general, this disclosure relates to magnetic recording media that include a composite structure. A composite structure is a structure that is formed of multiple components. By controlling the design and fabrication of each component, the overall quality and performance of the composite magnetic recording media may be improved.

Figure 1:
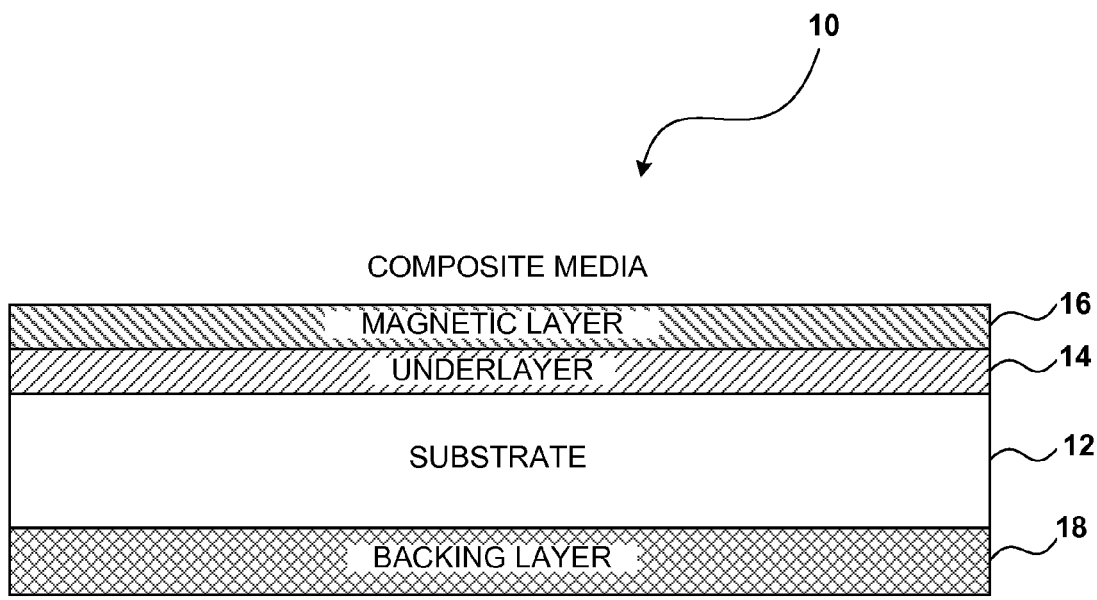
FIG. 1 is a cross-sectional view of an exemplary magnetic recording medium.

FIG. 1 is a cross-sectional view of an exemplary magnetic recording medium. By way of example, magnetic recording medium 10 may be a magnetic hard drive, a magnetic diskette, magnetic tape, or the like. Regardless, magnetic recording medium 10 includes a substrate 12. Substrate 12 defines a first side and a second side opposite the first side. A non-magnetic underlayer 14 is formed over the first side of substrate 12. Underlayer 14 contacts substrate 12 on one surface and defines a coating surface on an opposite surface. A magnetic layer 16 is further formed over the coating surface defined by underlayer 14. In addition, a backing layer 18 may be formed over the second side of substrate 12.

In this disclosure, different layers of a composite magnetic recording medium are illustrated and described. Generally, the layers are adjacently positioned for ease of discussion, meaning that the different layers are positioned in abutting arrangement without intervening layers. However, unless otherwise noted, it should be appreciated that any of the disclosed layers may be formed over one another or directly deposited on one another. As used herein, the phrase "formed over" means that a composite magnetic recording medium layer is positioned over a previously established composite magnetic recording medium layer. The phrase "formed over" also means that one or more intervening components, for example, additional layers, features, or elements, may be included between one magnetic composite magnetic recording medium layer and another composite magnetic recording medium layer, although intervening components such as intervening layers are not required. By contrast, the phrase "directly deposited on" means that a composite magnetic recording medium layer is positioned directly adjacent a previously established composite magnetic recording medium layer without any additional intervening components.

Substrate 12 functions as a support carrier for magnetic recording medium 10 and may be formed from any suitable materials. For example, substrate 12 may include glass, plastics, organic resins, metals, and the like. In cases, substrate 12 may include a polymeric film. Any suitable polymer or combination of polymers may be used. Polymers may be selected for chemical compatibility, to impart mechanical or electromagnetic characteristics to magnetic recording medium 10, or for other characteristics. Polymers that are flexible, rigid, electrically resistive, electrically conductive and the like are known in the art. Suitable polymers may include polyesters such as polyethylene terephthalate (PET), polyethylene naphthalate (PEN), blends or copolymers of polyethylene terephthalate and polyethylene naphthalate; polyolefins (e.g., polyethylene, polypropylene, polystyrene); cellulose derivatives; polyamides; polyimides; and combinations thereof. In addition, substrate 12 may include various other polymers, binders, or additives, such as carbon black and silica.

Backing layer 18 may be formed over at least a portion of a backside of substrate 12. Backing layer 18 may have a controlled surface roughness that, for example, influences the winding and unwinding characteristics of certain types of magnetic recording medium, such as a magnetic tape. Backing layer 18 may also provide dimensional stability to composite magnetic recording medium 10 by, for example, minimizing the cupping and curing of the edges of magnetic recording medium 10. In some examples, backing layer 18 may include a component that provides electrical resistivity to composite magnetic recording medium 10. For example, backing layer 18 may include carbon black. An electrically resistive backing layer may improve the electromagnetic characteristics of a composite magnetic recording medium 10. In addition, backing layer 18 may include binder components. Any suitable binder components that are chemically compatible and mechanically stable may be used. In some cases, binder components may include polyurethanes and polyolefins, a phenoxy resin, a nitrocellulose, and combinations thereof. Backing layer 18 may include additional polymers, pigments, binders, solvents and additives, as will be appreciated by those skilled in the art.

Magnetic recording medium 10 also includes underlayer 14. As will be described, the underlayer compositions of this disclosure may allow for the formation of an extraordinarily smooth, thin underlayer, which in turn may allow for the formation of a smooth magnetic layer 16. Magnetic domain density may be increased on a smooth magnetic layer, thereby increasing the data storage capacity of the resulting magnetic recording medium. In addition, a particularly thin underlayer 14 may be formed when using the compositions described herein. A thin underlayer may reduce the cost and complexity of magnetic recording medium 10. Further, a thin underlayer offers dimensional flexibility, a feature that is desirable when external constraints are imposed on magnetic recording medium dimensions.

An underlayer composition suitable for creating underlayer 14 may have a formulation and characteristics as described below. In general, an underlayer composition will include a primary pigment and a conductive carbon black. Together with additional binders and additives, the primary pigment and conductive carbon black may be incorporated into the underlayer composition.

Primary pigments suitable for the underlayer composition may include non-magnetic particles, such as iron oxides, titanium dioxide, titanium monoxide, alumina, tin oxide, titanium carbide, silicon carbide, silicon dioxide, silicon nitride, boron nitride, and the like. As an example, a primary pigment may be formed with a non-magnetic α-iron oxide, which can be acidic or basic in nature. An exemplary α-iron oxide primary pigment is commercially available from Toda Kogyo under the name DA-0873. In some examples, primary pigment particles may include a coating layer that coats a peripheral surface of the pigment particles. For example, primary pigment particles may be coated with an electro-conductive material such as carbon, tin, or similar materials, which may affect the electromagnetic characteristics of composite magnetic recording medium 10.

Primary pigment particles may vary in size and may fall within a size distribution arrangement. Further, the size distribution arrangement can be used to calculate an arithmetic average particle size. For underlayer compositions of this application, an average pigment particle size may be between approximately 35 and 100 nanometers, such as between approximately 55 and 80 nanometers, or between approximately 65 and 75 nanometers. Regardless, a distribution of particle sizes will be present in the underlayer composition.

Among all components, a primary pigment of particles may comprise between approximately 55 and 75 weight percent of an underlayer composition, such as between approximately 60 and 70 weight percent of an underlayer composition, or between approximately 62.5 and 67.5 weight percent of an underlayer composition. As used herein, the phrase "weight percent" refers to the weight of a constituent component relative to the total weight of the final composite underlayer composition, excluding the weight of processing additives and solvents that would normally be removed, for example, by evaporation, during the formation of the final composite underlayer composition.

An underlayer composition may also include a carbon black component to reduce the electrical resistivity of a recording surface of a magnetic recording medium. Reduced electrical resistivity of the recording surface may improve compatibility between a magnetic recording medium and commercially available magnetoresistance and giant magnetoresistance heads. In some examples, an underlayer composition of this disclosure may have a significant amount of carbon black relative to the amount of primary pigment. This high carbon black loading may contribute to the unique physical characteristics of the underlayers described herein, including, for example, the high compressibility ratios discussed below. In cases, the underlayer may include between approximately 10 and 25 weight parts of carbon black per 100 weight parts of primary pigment, such as between approximately 12 and 20 weight parts of carbon black per 100 weight parts of primary pigment, or between approximately 15 and 17 weight parts of carbon black per 100 weight parts of primary pigment. Different types of carbon black that may be used are known in the art, including, for example, furnace black, thermal black, and acetylene black. An exemplary carbon black is commercially available from Cabot under the name Black Pearls® 880 (BP880).

A wetting agent may also be incorporated in an underlayer composition. A wetting agent may reduce the surface tension of an underlayer formulation and promote dispersion of constituent underlayer components. In this manner, a wetting agent can improve the dispersion rheology of an underlayer formulation. An underlayer formulation with a suitable amount of wetting agent may also result in a self-leveling underlayer, meaning that gravity alone will adequately spread the underlayer formulation into a substantially even and uniform layer without mechanical assistance. Exemplary wetting agents include Disperbyk® 2000, Disperbyk® 161, and Disperbyk® 2155, all available from available from Byk Additives & Instruments, as well as Joncryl® 587 available from BASF, Resimene® 747 available from Ineos Melamines, and combinations of all of the preceding. When used, the amount of wetting agent added to the underlayer may be proportional to the amount of primary pigment. For example, a wetting agent may be added between approximately 2.5 and 6.5 weight parts per 100 weight parts of primary pigment, such as between approximately 3.5 and 5.5 weight parts per 100 weight parts of primary pigment, or between approximately 4.25 and 4.27 weight parts per 100 weight parts of primary pigment.

Additional additives and binders may also be incorporated into the underlayer composition. For example, underlayer 14 may include a binder resin, such as a thermoplastic resin, in conjunction with other resin components, including additional binders, surfactants, and activators. Any binder materials that hold underlayer components in a reasonably fixed orientation after curing may be suitably used. In some examples, underlayer 14 may use a binder component that includes one or more of a polyurethane resin, a vinyl chloride resin, a vinyl chloride-vinyl acetate copolymer, vinyl chloride-vinyl acetate-vinyl alcohol copolymer, vinyl chloride-vinyl acetate-maleic anhydride, a non-halogenated vinyl copolymer, copolymers of monomers such as (meth)acrylonitrile; a non-halogenated, hydroxyl functional vinyl monomer; a non-halogenated vinyl monomer bearing a dispersing group, and one or more non-halogenated nondispersing vinyl monomers, and combinations thereof. In cases, useful polyurethanes include polyester-polyurethane, polyether-polyurethane, polycarbonate-polyurethane, polyester-polycarbonate-polyurethane, polycaprolactone-polyurethane, and combinations thereof. Other resins may be used in addition to, or instead of, the resins listed above. For example, a resin such as bisphenol-A epoxide, styrene-acrylonitrile, or nitrocellulose may be used as a binder component for the underlayer.

The amount of binder added to the underlayer composition can vary depending on the specific binder material used and the selection of other underlayer components. In some cases, for example, when a polyurethane binder component is used in the underlayer, the amount of binder may be between approximately 3 and 12 weight parts per 100 weight parts of primary pigment, such as between 5 and 10 weight parts per 100 weight parts of primary pigment, or between 7 and 8 weight parts per 100 weight parts of primary pigment. In some examples, additional or different binders may be used. For example, a binder may comprise a vinyl binder, such as a vinyl chloride copolymer binder. In cases where a vinyl binder is used with a polyurethane binder, the vinyl binder may be between approximately 5 and 20 weight parts per 100 weight parts of primary pigment, such as between approximately 10 and 15 weight parts per 100 weight parts of primary pigment, or between approximately 11 and 13 weight parts per 100 weight parts of primary pigment. The weight parts of the vinyl binder may be in addition to the example weight parts of the polyurethane binder listed above.

In addition to the binder components identified above, a polyhydric binder may also be added to an underlayer formulation. In some examples, a polyhydric binder may be used in conjunction with another binder component and an activator component. Polyhydric binders and their functionality are discussed in greater depth below with respect to magnetic layer formulations, but in general a polyhydric binder may react with excess activator material to create a more durable magnetic recording medium. When used, a polyhydric binder may be in the underlayer formulation between approximately 0.1 and 5 weight parts per 100 weight parts of primary pigment, such as between approximately 0.5 and 3 weight parts per 100 weight parts of primary pigment, or between approximately 1 and 1.75 weight parts per 100 weight parts of primary pigment.

As noted, the underlayer may include further components, such as surfactants, lubricants, activators, and the like. In some examples, the underlayer may include surface treatment agents such as phenylphosphinic acid (PPiA), 4-nitrobenzoic acid, various other adducts of sulfuric, sulfonic, phosphoric, phosphonic, carboxylic acids, and combinations thereof.

An underlayer formulation may also include an activator for crosslinking various underlayer components. In cases, an activator may contain one or more isocyanate functional groups. For example, an activator may be a polyisocyanate activator, such as a diisocyanate activator. Polyisocyanate activators may include, for example, the reaction product of an excess of a polyisocyanate with polyols, including, in some cases, an oligomeric polyol. As with other underlayer components, the amount of activator will vary depending on the specific activator selected and the composition of other underlayer components. That being said, an exemplary amount of activator may be between approximately 2 and 5 weight parts per 100 weight parts of primary pigment, such as between approximately 2.75 and 4.25 weight parts per 100 weight parts of primary pigment, or between approximately 3.2 and 3.8 weight parts per 100 weight parts of primary pigment.

One or more lubricants may desirably be incorporated into underlayer 14. After fabrication, the lubricants may migrate to a recording surface of the magnetic recording medium. In this manner, friction can be reduced between a magnetic recording medium and a magnetoresistance head during a data reading or writing operation, resulting in improved electromechanical performance. Exemplary lubricant may include fatty acids. In cases, a fatty acid lubricant includes a stearic acid lubricant, for example, formed from a butyl stearate fatty acid ester. Further fatty acids that can be used instead of, or in addition to, a stearic acid lubricant, include, for example, myristic acid, palmitic acid, oleic acid, and combinations thereof.

Underlayer 14 may also include a fatty acid ester lubricant such as butyl stearate, isopropyl stearate, butyl oleate, butyl palmitate, butylmyristate, hexadecyl stearate, oleyl oleate, and combinations thereof. One or more of the fatty acid esters may be utilized alone or in combination with the fatty acids noted above. Other examples of useful lubricants include those selected from the group consisting of silicone compounds such as silicone oils, fluorochemical lubricants, fluorosilicones, and particulate lubricants such as powders of inorganic or plastic materials. In some examples, underlayer 14 may include an amide lubricant, which may reduce the viscosity of an underlayer coating formulation or improve the stiction and release properties of formed composite magnetic recording medium.

The amount of lubricant in the underlayer composition may vary based on the number of lubricants employed, the desired performance characteristics of the magnetic recording medium, and the characteristics of the other components selected for the underlayer composition. In some cases, a lubricant may range between approximately 1 and 10 weight parts per 100 weight parts of primary pigment. In further cases, the lubricant may range between approximately 3 and 7 weight parts per 100 weight parts of primary pigment. For example, an underlayer composition may include between approximately 2 and 6 weight parts of a fatty acid lubricant per 100 weight parts of primary pigment, and between approximately 0.2 and 2.5 weight parts of a fatty acid ester lubricant per 100 weight parts of primary pigment.

After selecting a desired combination of underlayer components, the constituent components can be combined together and processed to form underlayer 14. As an example, constituent underlayer components may be combined by mixing the various components together using, for example, a double planetary mixer. Processing solvents such as cyclohexanone, methyl ethyl ketone, toluene, xylene, tetrahydrofuran, methyl isobutyl ketone, methyl amyl ketone, or the like may be added to improve dispersion and mixing of the various components. In addition, the mixture of underlayer components may be deagglomerated using, for example, a sand milling process. Deagglomeration promotes uniform average particle sizes in underlayer mixture, which may help form a smooth underlayer.

Techniques may then be used to form underlayer 14 from the resultant underlayer mixture. For example, the underlayer mixture may be spread, sprayed, painted, or otherwise transferred to substrate 12. For example, an apparatus such a coating system may be used to transfer underlayer mixture to substrate 12. Various coating systems that may be useful are known, including slot die coating, extrusion coating, curtain coating, roll coating, gravure coating, bar coating, and the like.

In the illustrated example of FIG. 1, magnetic recording medium 10 also includes magnetic layer 16. Magnetic layer 16 is formed over underlayer 14. In general, magnetic layer 16 includes a plurality of magnetic particles contained in a binder. Additives such as surfactants, wetting agents, lubricants, and abrasives may also be added to improve the quality and performance of the magnetic recording medium. Specifically, magnetic layer 16 may have a formulation and characteristics as described below.

Magnetic layer 16 includes a plurality of magnetic particles that form a pigment. Magnetic particles may be acicular or needle like magnetic particles. Typical acicular particles include particles of ferromagnetic iron oxides such as gamma-ferric oxide ($\gamma$-$Fe_2O_3$), complex oxides of iron, cobalt, and nickel, and various ferrites and metallic iron particles. Magnetic particles may also be tabular or platelet-like magnetic particles such as hexagonal barium ferrites. The particles can be doped with one or more ions of a polyvalent metal such as titanium, tin, cobalt, nickel, zinc, manganese, chromium, or the like as is known in the art. The particles may also have a tailored oxide coating that surrounds a peripheral surface of the particles. The oxide coating can passivate the magnetic particles from rapid oxidation, thereby preventing unwanted reactivity under ambient conditions.

An oxide passivation layer over a magnetic particle may define a measurable coating thickness. For example, an oxide passivation layer can be measured as the average coating thickness that extends orthogonally off of a plane defined by a surface of a magnetic particle. In some cases, an average oxide passivation layer may be greater than approximately 0.5 nanometers thick, such as greater than approximately 1.3 nanometers thick, or greater than approximately 3.0 nanometers thick. In addition to preventing unwanted reactivity, an oxide passivation layer can also change the electromagnetic characteristics of a magnetic particle. Different electromagnetic characteristics for different oxide passivation layer thicknesses are provided in Example 1 below.

Magnetic particles may be any suitable size and may exhibit any appropriate electromagnetic characteristics. In cases, magnetic particles may have an average major axis length between approximately 25 and 50 nanometers, such as between approximately 30 and 40 nanometers, or between approximately 33 and 37 nanometers. Because magnetic particles can take different shapes, the term average magnetic particle size means the following: (1) in the case where the shapes of particles are acicular or needle like, a particle size is indicated by the length of a long axis constituting the particle, i.e., a long axis length, (2) in the case where the shapes of particles are tabular or platelet like (provided that the thickness or height is smaller than the longest diameter of the tabular plane), a particle size is indicated by the longest diameter of the tabular plane, and (3) in the case where the shape of particles are spherical, polyhedral or amorphous and it is impossible to specify the length of long axis constituting the particle from the shape, a particle size is indicated by an equivalent-circle diameter of the particle.

A pigment of magnetic particles for use in this disclosure may comprise between approximately 55 and 75 weight percent of a magnetic layer composition, such as between approximately 60 and 70 weight percent of magnetic layer composition, or between approximately 62.5 and 67.5 weight percent of magnetic layer composition. As used herein, the term weight percent refers to the weight of a constituent component relative to total weight of the final composite magnetic layer composition, excluding the weight of processing additives and solvents that would normally be removed, for example, by evaporation, during the formation of the final composite magnetic layer composition. An exemplary pigment is commercially available from Dowa Holdings Co., Ltd (Japan) under the name DA200.

A magnetic layer coating formulation may also include a binder component. Any binder materials that hold magnetic layer components in a reasonably fixed orientation after curing may be suitably used. In some examples, suitable binder components may include polyurethane resins and vinyl resins. For example, polyurethane resins include blends and co-polymers of polyurethanes, including thermoplastic polyurethane resins, polyester-polyurethane, polyether-polyurethane, polycarbonate-polyurethane, polyester-polycarbonate-polyurethane, and polycaprolactone-polyurethane. In addition, vinyl resins include blends and co-polymers, including vinyl chloride, vinyl chloride-vinyl acetate copolymer, vinyl chloride-vinyl acetate-vinyl alcohol copolymer, vinyl chloride-vinyl acetate-maleic anhydride, vinyl chloride vinylidene chloride copolymers, vinyl chloride acrylonitrile copolymers, and the like. The amount of binder component in a magnetic layer formulation may range between approximately 5 and 25 weight parts per 100 weight parts of magnetic pigment, such as between approximately 12 and 20 weight parts per 100 weight parts of magnetic pigment, or between approximately 14 and 18 weight parts per 100 weight parts of magnetic pigment.

In some cases, a magnetic layer coating formulation may include a combination of different binder components. In particular, a polyhydric binder may be added to one or more binder components. The term polyhydric binder means that the binder has two or more alcohol functional groups (i.e., —OH) and may therefore be a diol, triol, tetrol, etc. In particular, a polyhydric binder may have 3 or more alcohol functional groups, 10 or more functional groups, or even 25 or more functional groups. In some cases, a polyhydric binder can even have more than 100 alcohol functional groups. Suitable polyhydric binders may include poly(vinyl acetal), poly (vinyl butyral), poly(vinyl alcohol), and nitrocellulose.

Without being bound by theory, it is believed that a robust and durable magnetic recording medium may be created by combing a polyhydric binder with an activator component and one or more other binder components. Traditional magnetic layer formulations have relied on an excess amount of activator. While the excess concentration of activator results in a fully crosslinked and hardened magnetic layer, it also leaves unreacted activator in the finished magnetic layer. This unreacted activator may affect the electromagnetic performance of the magnetic recording medium or the physical integrity of the medium, such as the hydrophilicity of the medium. Adding a polyhydric binder to the magnetic layer formulation may consume the excess activator, resulting in a more durable magnetic recording medium. The reaction between a polyhydric binder and an activator may be slower than the reaction between the activator and a primary binder component. As a result, a primary binder may provide significant mechanical strength for a formed magnetic layer while a polyhydric binder may function to react excess activator. This may result in a more crosslinked magnetic recording layer that has a higher glass-transition temperature (Tg).

A particularly durable recording medium may result when a polyhydric binder is combined with an activator that includes one or more isocyanate functional groups (i.e., —N=C=O). For example, activators with one or more isocyanate functional groups include tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co., Ltd.; and Desmodule L, Desmodule IL, Desmodule N and Desmodule HL manufactured by Sumitomo Bayer Co., Ltd. A single activator may be used or a combination of two or more activators may be used.

The relative amount of activator and polyhydric binder will vary depending on the specific components selected and the overall composition of the magnetic layer formulation. As examples, the activator may form part of the magnetic layer between approximately 1 and 5 weight parts per 100 weight parts of magnetic pigment, such as between approximately 2.25 and 3.75 weight parts per 100 weight parts of magnetic pigment. In addition, the polyhydric binder may be in the magnetic layer between approximately 0.1 and 10 weight parts per 100 weight parts of magnetic pigment, such as between approximately 0.5 and 4 weight parts per 100 weight parts of magnetic pigment, or between approximately 1 and 1.75 weight parts per 100 weight parts of magnetic pigment. Generally, enough polyhydric binder may be added to the magnetic layer formulation to consume any excess activator.

As an example of the binder and activator combinations discussed above, an activator with an isocyanate functional group may be combined with a vinyl chloride binder, a polyurethane binder, and polyvinyl acetyl polyhydric binder. A commercially available activator with an isocyanate functional group may be obtained from Bayer MaterialScience under the designation Desmodur® L 67 BA (L67). A commercially available vinyl chloride binder component may be obtained from Sumitomo Chemical Co., Ltd under the designation MR-104. A commercially available polyurethane component may be obtained from Shinko Sangyo Co., Ltd under the designation L7525. Further, a commercially available polyvinyl acetyl binder component may be obtained from Sekisui Products LLC under the designation S-LEC B BX-L (BX-L). The activator may be incorporated into a magnetic layer coating formulation in an amount of approximately 0.3 to 1.7 weight parts per 100 weight parts of magnetic pigment, while the vinyl chloride binder component may be incorporated in an amount of approximately 5 to 15 weight parts per 100 weight parts of magnetic pigment, the polyurethane binder component in an amount of approximately 1 to 9 weight parts per 100 weight parts of magnetic pigment, and the polyvinyl acetyl binder component in an amount of approximately 0.2 to 2 weight parts per 100 weight parts of magnetic pigment.

When necessary, the magnetic layer coating formulation may include additional components as is known in the art. Additives may include a surfactant or wetting agent, a lubricant, carbon black, a head cleaning agent, an antistatic compound, and similar performance enhancing compounds.

As an example, a magnetic layer coating formulation may include various lubricants, such as a fatty acid lubricant and a fatty acid ester lubricant. Suitable fatty acid lubricants include, for example, stearic acid, myristic acid, palmitic acid, oleic acid, and combinations thereof. Suitable fatty acid ester lubricants include, for example, butyl stearate, isopropyl stearate, butyl oleate, butyl palmitate, butylmyristate, hexadecyl stearate, oleyl oleate, and combinations thereof. Other examples of useful lubricants include those selected from the group consisting of silicone compounds such as silicone oils, fluorochemical lubricants, fluorosilicones, and particulate lubricants such as powders of inorganic or plastic materials. Various lubricant compounds can be used singly or in combination. In cases, a magnetic layer coating formulation may include between approximately 0.1 and 10 weight parts of lubricant per 100 weight parts of magnetic pigment, such as between approximately 0.5 and 5 weight parts of lubricant per 100 weight parts of magnetic pigment, or between approximately 1.2 and 3.3 weight parts of lubricant per 100 weight parts of magnetic pigment.

As noted above, a magnetic layer coating formulation may also include one or more surfactant additives. Suitable surfactants may include phenylphosphinic acid (PPiA), 4-nitrobenzoic acid, various other adducts of sulfuric, sulfonic, phosphoric, phosphonic, carboxylic acids, and combinations thereof. The amount of surfactant in a magnetic coating formulation will vary, but may be between approximately 1 and 10 weight parts per 100 weight parts of magnetic pigment, such as between approximately 2 and 7 weight parts per 100 weight parts of magnetic pigment, or between approximately 3.1 and 5.6 weight parts per 100 weight parts of magnetic pigment.

A magnetic layer coating formulation may also include a head cleaning agent, such as a head cleaning agent that includes abrasive particles. For example, magnetic recording tape having large particles in a magnetic recording layer are described in commonly-assigned U.S. Patent Publication No. 2009/0162701 A1, the entire contents of which are hereby incorporated by reference. Head cleaning agents in a magnetic recording medium can prevent fouling buildup on a magnetic recording head while reading and writing data to the magnetic recording medium. Also, abrasive particles in the magnetic recording medium may provide a load bearing surface for a magnetic recording head to traverse. In this manner, stiction may be reduced between a magnetic recording medium and a magnetic recording head, improving the overall performance of a magnetic data storage system.

Figure 2:
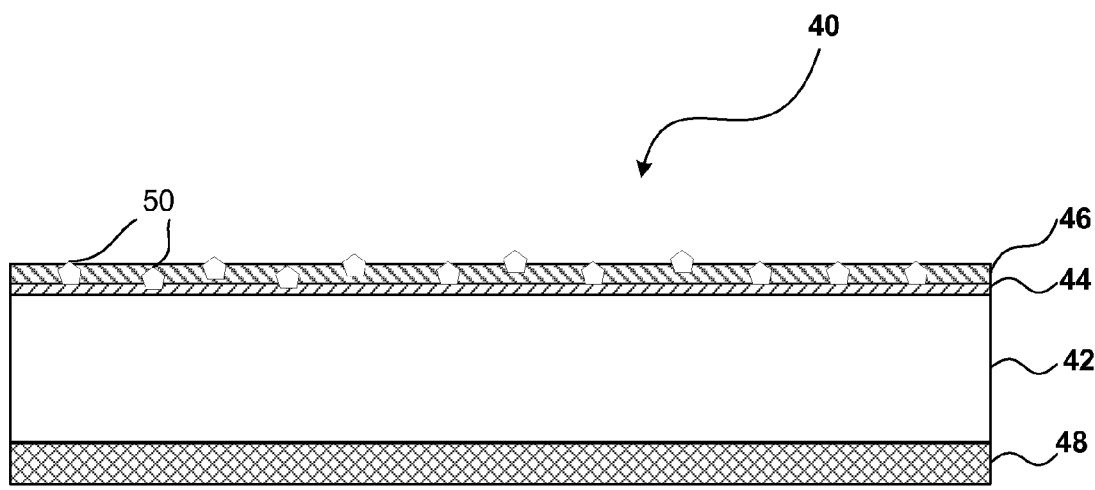
FIG. 2 is a cross-sectional view of a further exemplary magnetic recording medium that includes load bearing materials.

FIG. 2 is a cross-sectional view of an example magnetic recording medium 40 that includes abrasive load bearing particles 50. Magnetic recording medium 40 includes substrate 42, which defines a first side and a second side opposite the first side. Underlayer 44 is formed over a first side of substrate 42 to define a coating surface. Magnetic layer 46 is further formed over the coating surface of underlayer 44. Magnetic layer 46 includes a plurality of abrasive particles 50. Also, backing layer 48 may be formed over a second side of substrate 42.

In the illustrated example, abrasive particles 50 reside in a plurality of different planes of the magnetic recording medium 40. In some cases, abrasive particles 50 reside fully within the magnetic layer. In other cases, abrasive particles 50 extend above the plane defined by magnetic layer 46. In yet further cases, abrasive particles 50 extend through magnetic layer 46 into underlayer 44.

Regardless of specific positioning, suitable abrasive particles that may be incorporated into a magnetic layer coating formulation for head cleaning include alumina, chromium dioxide, zirconium dioxide, alpha iron oxide, titanium dioxide, silica, silicon carbide, antimony pentoxide, and combinations thereof. In some cases, abrasive particles may have an average major axis length between approximately 2 and 5 times greater than the thickness of magnetic layer 16. In some cases, abrasive particles may have an average major axis length between approximately 50 and 1000 nanometers, such as between approximately 65 and 350 nanometers. In appropriate cases, a combination of different sized particles may be used. As a non-limiting example, abrasive particles with an average major axis length between approximately 150 and 450 nanometers, such as approximately 250 nanometers may be combined with abrasive particles with an average major axis length between approximately 50 and 125 nanometers, such as approximately 70 nanometers. The particles may be combined proportionally or in unequal ratios. For example, a ratio of smaller particles to larger particles may be approximately 1-to-1, approximately 3-to-1, approximately 5-to-1, or even approximately 10-to-1.

After selecting a desired combination of components for a magnetic layer formulation, the constituent components can be combined together and processed to form the magnetic layer. In general, any processes known in the art may be used to combine, react, and disperse the components of a magnetic layer formulation. For example, constituent magnetic layer components may be combined, mixed, and dispersed to create a magnetic layer using the tools and techniques discussed above with respect to formation of the underlayer.

Figure 8:
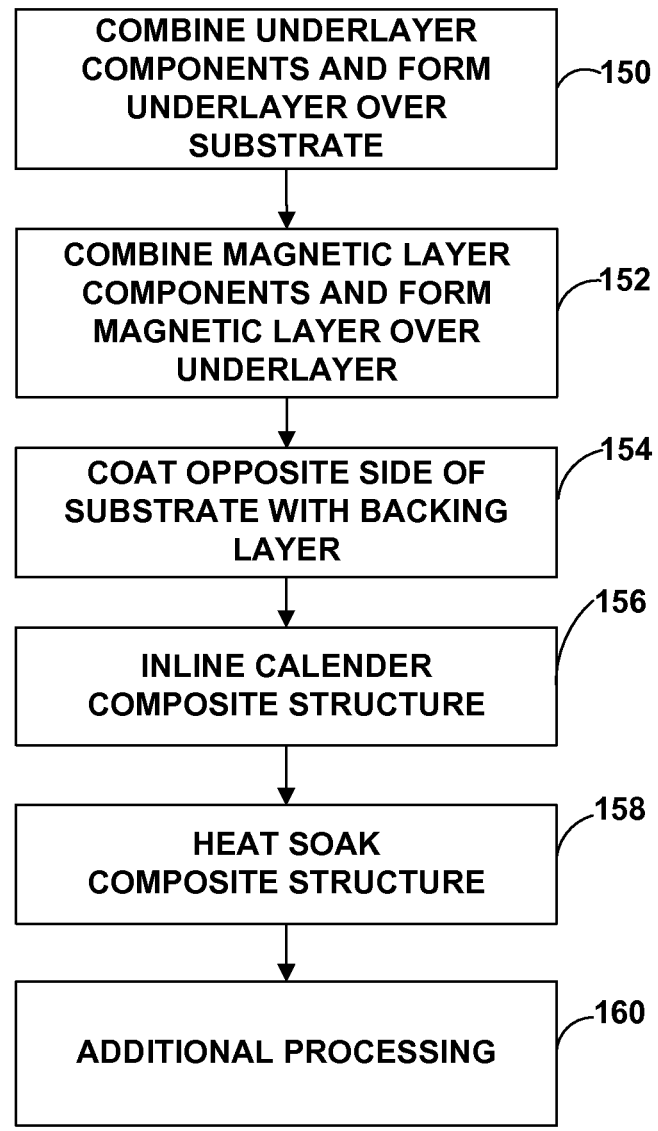
FIG. 8 is a block diagram of a process that may be used to manufacture a magnetic recording medium of this disclosure.

FIG. 8 is a flow diagram of an exemplary process that may be used to manufacture magnetic recording medium of this disclosure. The process employs a substrate that functions as a carrier layer for the magnetic recording medium. A manufacturer selects and combines underlayer components according to the parameters outlined above and further forms the underlayer coating formulation over the substrate (150). The manufacturer similarly selects and combines magnetic components according to the parameters identified in this application and further forms the magnetic layer coating formulation over the underlayer (152).

In some cases, the manufacturer may form the underlayer and magnetic layer sequentially. For instance, the manufacturer may form and dry the underlayer and then form and dry the magnetic layer. Alternatively, the manufacturer may form the underlayer and magnetic layer substantially simultaneously using, for example, a wet-on-wet process such as a dual-slot or sequential die coating process. Where appropriate, a magnetic layer may be directly deposited on a substrate.

After forming a magnetic layer over a substrate, the manufacture may orient the magnetic particles in an applied magnetic field. For example, the manufacturer may traverse the magnetic layer through an applied magnetic field formed by electrical coils, permanent magnets, or a combination of both. The magnetic particles may assume a longitudinal magnetic anisotropy or a perpendicular magnetic anisotropy through directional control of the applied magnetic field. The magnetic particles may then be dried using, for example, a conventional oven.

Subsequent to forming, optionally orienting, and drying a magnetic layer, the manufacturer may coat a backing layer on an opposite side of the substrate from the magnetic layer (154). The manufacturer may then dry the backing layer in anticipation of further processing steps on the magnetic medium.

As an example of an additional processing step, a manufacturer may calender a composite magnetic recording structure (156). Calendering may smooth the magnetic recording surface to reduce data-error rates in subsequent use. Calendering may be in-line or off-line, and may include compliant-on-steel (COS) calendering, steel-on-steel (SOS) calendering, or combinations of calendering. COS in-line calendering may employ one or more in-line nip stations having a steel or other generally non-compliant roller that contacts a magnetic layer and a rubberized or other generally compliant roller that contacts a backside. By contrast, SOS in-line calendering may employ one or more nip stations that have generally non-compliant (e.g., steel) rollers. In cases, calendering rollers may be heated to, for example, a temperature greater than approximately 50 degrees Celsius.

In some examples, a composite magnetic recording medium formed from the compositions described herein may require comparatively less calendering than a standard magnetic medium while achieving similar or better degrees of magnetic layer surface smoothness. Less calendering may be beneficial because less stress is applied to the various layers of the composite medium, and stress may embrittle or fatigue a composite structure. In cases, a calendering step may include applying a pressure-to-velocity ratio less than approximately 7.5 (pounds/inch)/(feet/second) to the magnetic layer, such as less than approximately 4.5 (pounds/inch)/(feet/second), less than approximately 3.7 (pounds/inch)/(feet/second), or less than approximately 2.5 (pounds/inch)/(feet/second).

A manufacturer may heat soak a composite magnetic recording medium (158). Heat soaking may further dry recently formed composite layers. Heat soaking may also induce or accelerate crosslinking between activators and reactive functional groups, curing the magnetic medium. In some examples, heat soaking can relax residual stress in the magnetic medium to prevent later curling or warping of the medium. As an advantage of the materials and formulations disclosed in this application, composite magnetic recording mediums may be subject to higher heat soaking temperatures than normal magnetic recording mediums are normally subject. For example, a magnetic recording medium, such as a wound roll of magnetic tape, may be placed in an environment greater than approximately 60 degrees Celsius, such as greater than 70 degrees Celsius, for a period greater than approximately 24 hours, such as a period of approximately 48 hours.

When appropriate, a manufacturer may subject a magnetic recording structure to additional processing steps (160). Exemplary steps may include slitting, burnishing, wiping, degaussing, servo pattern writing, spooling, and the like.

A magnetic recording medium constructed in accordance with this disclosure may exhibit a number of desirable electromagnetic performance characteristics. Magnetic coercivity is one electromagnetic performance characteristic. The phrase "magnetic coercivity" refers to the intensity of the magnetic field needed to reduce the magnetization of a magnetic material (in this case the magnetic recording medium) to zero after the material has reached magnetic saturation. A magnetic recording medium constructed in accordance with this disclosure may exhibit a magnetic coercivity greater than approximately 150 kiloampere/meter (1885 Oersted), such as greater than approximately 175 kiloampere/meter (2200 Oersted), or greater than approximately 190 kiloampere/meter (2388 Oersted).

In addition, a magnetic recording medium herein may exhibit favorable electrical resistivity values, which, as noted above, may be influenced by material selection and loading in the various layers of a composite medium. As examples, electrical resistivity of a magnetic side of magnetic recording medium 10 may be less than or equal to approximately $1 \times 10^8$ ohm/cm$^2$, such as less than or equal to approximately $5 \times 10^7$ ohm/cm$^2$, or less than or equal to approximately $1 \times 10^7$ ohm/cm$^2$.

Remnant magnetization is another tool to characterize the performance of a magnetic recording medium. Remnant magnetization refers to the permanent magnetization that remains in a magnetic material (in this case the magnetic recording medium) after saturation in a strong magnetic field (for example, 800 kiloampere/meter). Further, the phrase "remnant magnetization-thickness product" (Mr*t) refers to the product of remnant magnetization multiplied by the thickness of a magnetic layer. In examples of this disclosure, a magnetic recording medium herein may have a remnant magnetization-thickness product less than approximately 2.5 memu/cm$^2$, such as less than approximately 2.0 memu/cm$^2$, or less than approximately 1.7 memu/cm$^2$.

A magnetic recording medium of this disclosure may also exhibit an orientation ratio greater than approximately 2.2, such as greater than approximately 2.4, or greater than approximately 2.6. Orientation ratio is related to remnant magnetization, which is discussed above. An orientation ratio is calculated by determining a first remnant magnetization along a first direction of a magnetic recording medium. The first direction is the long axis of the medium, such as an axis parallel to a length of magnetic tape. The magnetic recording medium is then rotated in-plane 90 degrees, and remnant magnetization is determined for a second direction of the magnetic recording medium that is perpendicular to the first direction. The orientation ratio is finally calculated by dividing the remnant magnetization determined for the first direction of the magnetic recording medium by the remnant magnetization determined for the second direction of the magnetic recording medium.

A magnetic recording medium constructed in accordance with this disclosure may also exhibit a number of desirable physical characteristics. To begin, a magnetic recording medium defines an overall thickness. For example, magnetic recording medium 10 may define an overall thickness less than or equal to approximately 7500 nanometers. In cases, a magnetic recording medium may define an overall thickness greater than or equal to approximately 5500 nanometers. A magnetic recording medium may also define a range of thicknesses, for example, between approximately 6250 nanometers and 6750 nanometers.

Figure 3:
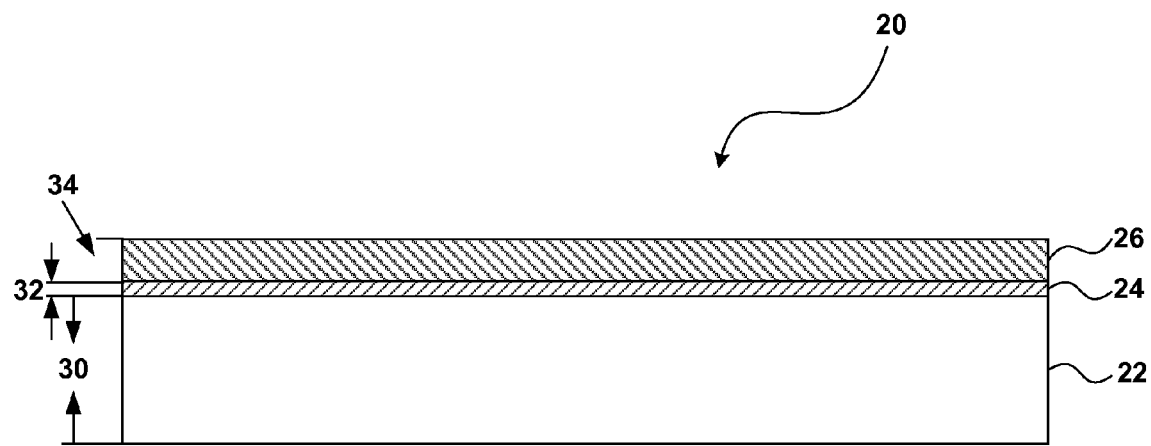
FIG. 3 is a cross-sectional view of another exemplary magnetic recording medium showing dimensional markings for different layers of the recording medium.

Individual components of a magnetic recording medium also define thicknesses. For example, FIG. 3 is a cross-sectional view of an exemplary magnetic recording medium 20 showing dimensional markings for different layers of the recording medium. Magnetic recording medium 20 includes substrate 22. Underlayer 24 is formed over substrate 22. Magnetic layer 26 is further formed over underlayer 24. In the illustrated example, underlayer 24 is directly deposited on substrate 22, and magnetic layer 26 is directly deposited on underlayer 24.

Substrate 22 defines an average thickness 30. A number of factors may influence the chosen thickness of substrate 22. For example, substrate thickness influences the overall thickness of a magnetic recording medium, which may be controlled by external considerations. Also, substrate thickness may affect the cost, performance, and durability of the magnetic recording medium itself. As an example, a thicker substrate may provide a more durable magnetic recording medium. Further, a substrate material may be less expensive than other materials used to form a composite magnetic recording medium. As a result, competitive advantage may be achieved by increasing substrate thickness while reducing the thickness of corresponding magnetic recording medium components. In accordance with this disclosure, an average thickness 30 of substrate 22 may be greater than or equal to approximately 1000 nanometers, such as greater than or equal to approximately 2500 nanometers, such as greater than or equal to approximately 5000 nanometers, or greater than or equal to approximately 7500 nanometers. In cases, an average thickness 30 of substrate 22 may be less than or equal to a given value. For example, an average thickness 30 of substrate 22 may be less than or equal to approximately 10,000 nanometers, such as less than or equal to approximately 7500 nanometers, or less than or equal to approximately 5500 nanometers. As an example, an average thickness 30 of substrate 22 may be between approximately 4500 nanometers and 5500 nanometers. More specifically, an average thickness 30 of substrate 22 may be approximately 5000 nanometers. As used herein, the term average thickness means an arithmetic mean thickness of the substrate as compiled from a plurality of measurements.

Underlayer 24 also defines an average thickness. In the example illustrated in FIG. 3, underlayer 24 defines average thickness 32. Similar to the selection of substrate 22, a number of criteria may be balanced when selecting a thickness for underlayer 24. For example, manufacturing capabilities and magnetic recording medium performance capabilities may be considered when selecting an average thickness 32 for underlayer 24. Traditional magnetic recording medium include a relatively thick underlayer under the belief that a thick underlayer leads to a smooth magnetic recording surface, which in turn improves the performance capabilities of the magnetic recording medium. However, magnetic recording medium of the present disclosure may advantageously use a relatively thin underlayer while meeting industry standards and customer performance demands. An average thickness 32 of underlayer 24 may be greater than or equal to approximately 381 nanometers (15 microinches), such as greater than or equal to approximately 508 nanometers (20 microinches), greater than or equal to approximately 710 nanometers (28 microinches), or greater than or equal to approximately 890 nanometers (35 microinches). In cases, an average thickness 32 of underlayer 24 may be less than equal to a given value. For example, an average thickness 32 of underlayer 24 may be less than equal to approximately 890 nanometers (35 microinches), such as less than or equal to approximately 813 nanometers (32 microinches), or less than or equal to approximately 508 nanometers (20 microinches). As an example, an average thickness 32 of underlayer 24 may be between approximately 710 nanometers (28 microinches) and 813 nanometers (32 microinches). More specifically, an average thickness 32 of underlayer 24 may be approximately 762 nanometers (30 microinches).

In cases, a relatively thin underlayer may be matched with a relatively thick substrate when forming a composite magnetic recording medium. For example, an average thickness of an underlayer may be less than or equal to approximately 22% of an average thickness of a substrate, such as less than or equal to approximately 16% of an average thickness of a substrate, or less than or equal to approximately 5% of an average thickness of a substrate.

Magnetic recording medium 20 also includes magnetic layer 26 that defines an average thickness 34. The magnetic layer thickness may depend on the type of magnetic material used, the quality of the medium, and the dimensions of the other components selected for the magnetic recording medium. Magnetic layer 26 may be any suitable thickness. As an example, an average thickness 34 of magnetic layer 26 may be greater than approximately 50 nanometers. As another example, an average thickness 34 of magnetic layer 26 may be less than approximately 150 nanometers. As a further example, an average thickness 34 of magnetic layer 26 may be between approximately 75 and 125 nanometers.

A backing layer, though not shown in FIG. 3, will also define a thickness if included on a magnetic recording medium. As examples, a backing layer thickness may be between approximately 100 and 800 nanometers, such as between approximately 254 and 762 nanometers, or between approximately 356 and 584 nanometers.

A magnetic recording medium constructed in accordance with this disclosure may exhibit other favorable physical characteristics. As noted above, a magnetic recording medium constructed using the features and compositions disclosed herein may beneficially provide a smooth underlayer surface, which in turn may translate into a smooth magnetic layer recording surface. A smooth magnetic layer recording surface may permit increased magnetic bit domain density, thereby increasing the storage capacity of the magnetic recording medium. The smoothness or roughness of a surface may be characterized using an atomic force microscope average surface roughness parameter (AFM Ra). In general, a probe with a radius of curvature less than or equal to 10 nanometers is traversed across an area 100 micrometers by 100 micrometers. Image processing is then performed to determine surface roughness parameters, such as average surface roughness Ra or average roughness depth (Rz). Although any instrument can be used, an exemplary tool for measuring surface roughness parameters is a Veeco Multimode AFM using a Digital Instruments NanoScope IIIa controller. The instrument can be coupled to a Veeco Model NP-S20 probe with a 100 square micrometers scansize. Data from the Veeco Multimode AFM may be processed for bearing analysis using Wyko Interferometer Vision for Profiler Software version 3.42.

Underlayer surface roughness parameters can be measured before forming a magnetic layer over the underlayer. As an example, an underlayer can be formed over a substrate and then dried. The dried underlayer defines a coating surface opposite the substrate that can be subject to surface roughness characterization. Traditionally, underlayer surface roughness is measured on the coating surface of a single underlayer, as opposed to the coating surface of a stacked underlayer comprising multiple individual underlayers. Uncalendered underlayers constructed in accordance with this disclosure may exhibit average surface roughness (Ra) values less than approximately 10.0 nanometers, such as less than approximately 7.5 nanometers, or less than approximately 7.0 nanometers. The uncalendered underlayers may further exhibit average roughness depths (Rz) less than approximately 175 nanometers, such as less than 160 nanometers. In some examples, underlayer surface roughness characteristics may improve with calendering because the calendering process can compress and smooth defects in the underlayer coating surface. In some examples, a highly compressive underlayer of this disclosure may accentuate the typical surface roughness benefits that calendering provides. For example, after calendering with a single nip station of steel-on-steel rollers closed with an average force of approximately 2500 pounds per linear inch, an underlayer of this disclosure may exhibit an average surface roughness less than approximately 4.5 nanometers, such as less than approximately 3.6 nanometers, or less than approximately 3.2 nanometers. In addition, the calendered underlayers may exhibit an average surface roughness depth less than approximately 65 nanometers, such as less than approximately 55 nanometers, or less than approximately 50 nanometers. As noted, the compressible underlayers of this disclosure may enhance and accentuate calendering benefits typically observed with standard recording media underlayers. In some examples, underlayer average surface roughness may decrease by greater than approximately 45 percent with calendering, such as greater than approximately 50 percent, or greater than approximately 55 percent. In addition, underlayer average surface roughness depths may decrease by greater than approximately 40 percent with calendering, such as greater than approximately 45 percent, or greater than approximately 50 percent.

While underlayer surface roughness parameters are described above, magnetic layers of this disclosure also exhibit a surface roughness. In some examples, the average surface roughness of a magnetic layer described herein may be between approximately 1.5 and 5 nanometers, such as between approximately 2 and 3.5 nanometers, or between approximately 2.25 and 2.75 nanometers.

In addition, a magnetic recording medium constructed according to this disclosure may exhibit improved abrasivity at a recording surface of the magnetic recording medium as compared to prior magnetic recording media. Abrasivity measures the general tendency of a magnetic recording medium to abrasively wear an object in contact with the recording medium. For example, recording medium abrasivity may indicate the tendency of a magnetic layer recording surface to wear a magnetic recording head adjacently positioned against the recording surface in a magnetic drive. As a corollary, recording medium abrasivity may also indicate the tendency of a magnetic recording medium to degrade upon repeated contact with an object, such as a magnetic recording head. In this regard, an abrasivity measurement may also be considered a durability loss measurement.

Figure 4:
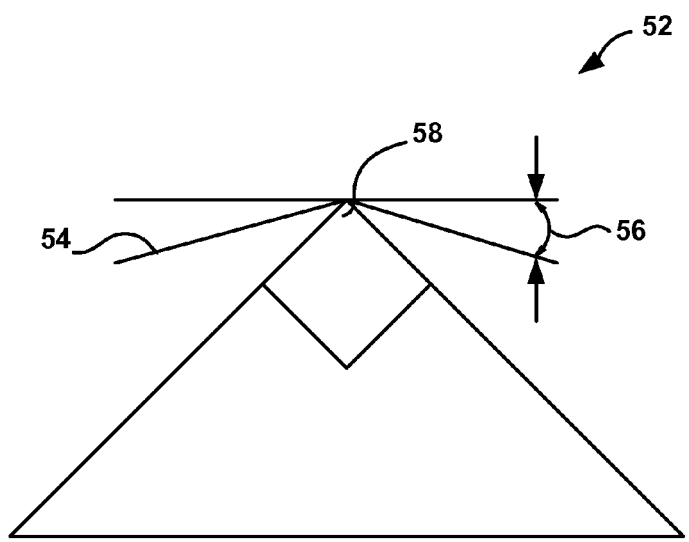
FIG. 4 is a conceptual diagram illustrating a system for measuring the abrasivity and durability loss of a magnetic recording medium.

FIG. 4 is a conceptual diagram illustrating a system for measuring abrasivity and, correspondingly, durability loss of a magnetic recording medium. The durability loss system 52 includes a test magnetic recording medium 54 that can be traversed across test bar 58. Test magnetic recording medium 54 is partially wrapped around test bar 58 at wrap angle 56. Magnetic recording medium 54 is positioned so that the magnetic recording surface of medium 54 is pressed against test bar 58 with a controlled amount of force. During testing, magnetic recording medium 54 may be repeatedly traversed back and forth over a contact position defined on test bar 58. Using the process, a portion of test bar 58 will be abrasively removed by magnetic recording medium 54. The amount of test bar 58 removed can be measured to determine the abrasivity of magnetic recording medium 54.

An exemplary abrasivity test used according to this disclosure is provided in section 9.12 of industry standard EMCA-319, as promulgated in June 2001. According to the standard, a test piece of magnetic recording tape 580 meters in length is passed for 100 passes (50 back-and-forth cycles) over a rectangular bar of Alfesil. The bar is approximately 4.5 mm square and at least 18 mm long. The magnetic recording tape is traversed across that bar at a speed of 3.0 m/s, under a tension of 1.0 Newtons, and at a wrap angle of 12 degrees. The bar is measured for deterioration, and the thickness of the bar worn away by the magnetic recording tape is characterized as the abrasivity of the magnetic recording medium. In some examples, a magnetic recording medium constructed in accordance with this disclosure may exhibit an abrasivity greater than approximately 15 micrometers, such as greater than approximately 25 micrometers, or greater than approximately 27.5 micrometers. Also, in some examples, a magnetic recording medium constructed in accordance with this disclosure may exhibit abrasivity less than approximately 45 micrometers, such as less than approximately 35 micrometers, or less than approximately 30 micrometers.

In examples, the described magnetic recording media may maintain abrasivity over extended service. For example, a magnetic recording medium may maintain substantially constant abrasivity beyond the 100 pass test described above with respect to industry standard EMCA-319. Substantially constant abrasivity means that the magnetic recording medium continues to wear a test bar at substantially the same rate after 100 passes as during the 100 pass test. A magnetic recording medium that maintains abrasivity beyond the limited 100 pass test above may exhibit improved durability over an extended service life as compared to a magnetic recording medium that does not maintain abrasivity beyond the 100 pass described above.

Accordingly, a magnetic recording medium may be subject to a two-pass abrasivity test. A two-pass abrasivity test may involve performing the EMCA-319 industry standard test a first time on a first piece of magnetic tape. The Alfesil test bar is replaced with a new, unabraded bar, and the EMCA-319 industry standard test is repeated a second time on the same piece of magnetic tape. The abrasivity of the magnetic recording medium may be measured after the first 100 passes and again after the second 100 passes. The two abrasivity values can be compared to evaluate the durability of the magnetic recording medium. The differences between that abrasivity of a magnetic recording medium after 100 passes and the abrasivity of the magnetic recording medium after 200 passes (i.e., abrasivity after 100 passes–abrasivity after 200 passes) is characterized as a two-pass abrasivity loss value. A magnetic recording medium constructed in accordance with this disclosure may exhibit a two-pass abrasivity (i.e., the abrasivity measured after 200 passes) greater than approximately 20 micrometers, such as between approximately 22.5 micrometers and 28.5 micrometers. In addition, the described magnetic recording medium may exhibit a two-pass abrasivity loss less than 5.0 micrometers, such as less than 2.0 micrometers, or less than 1.5 micrometers. In some examples, a magnetic recording medium may exhibit substantially no two-pass abrasivity loss, where substantially no loss means no loss measureable within a tolerance of plus or minus 0.25 micrometers.

Figure 5:
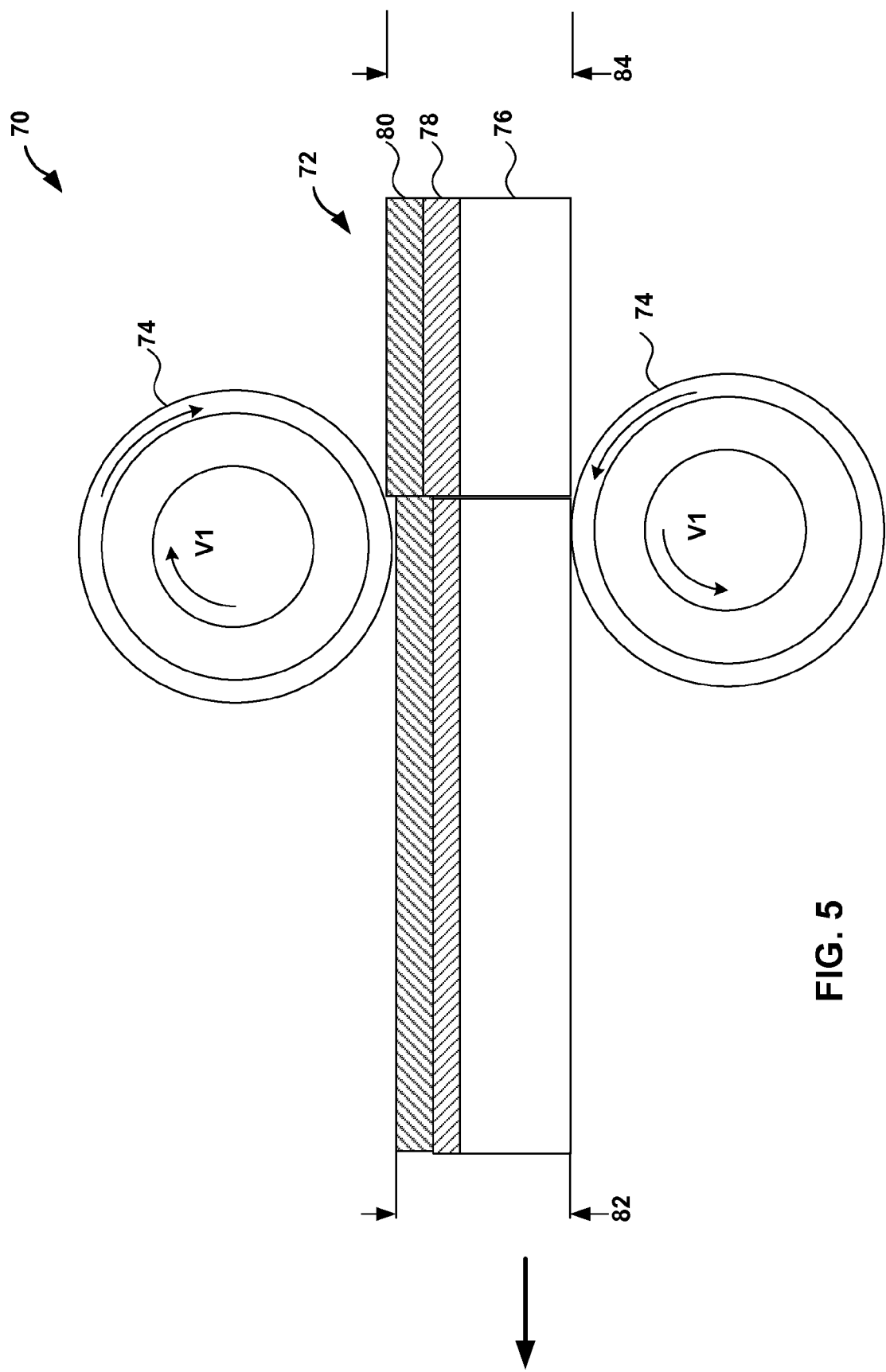
FIG. 5 is a conceptual diagram illustrating a system for measuring the compressibility ratio of a magnetic recording medium or a component of a magnetic medium.

In general, a magnetic recording medium may exhibit some degree of compressibility when placed under a controlled force. While compressibility can be measured using any controlled force, FIG. 5 is conceptual diagram illustrating an exemplary system for measuring the compressibility ratio of a magnetic recording medium or a component of a magnetic medium. In the illustrated example, measurement system 70 includes rollers 74 that traverse across two faces of magnetic recording medium 72. Rollers 74 define a nip point that can sandwich magnetic recording medium 72 under a controlled force, allowing a controlled compressibility to be measured. Rollers 74 are formed from a substantially incompressible material such as steel, ceramic, glass, or the like. In the example of FIG. 5, magnetic recording medium 72 includes substrate 76, with underlayer 78 formed over substrate 76, and magnetic layer 80 formed over underlayer 78. During operation, magnetic recording medium 72 is compressed between rollers 74 under a uniform force. The quotient of compressed thickness 82 to uncompressed thickness 84 is the compressibility ratio of magnetic recording medium 72. When an average force of approximately 2500 pounds per linear inch is applied between rollers 74 in measurement system 70, a magnetic recording medium constructed according to this disclosure compresses. In some examples, the magnetic recording medium compressibility ratio may be greater than or equal to approximately 10%, such as greater than or equal to 14%, or greater than or equal to 17%.

Measurement system 70 can also be used to measure the compressibility ratio of a specific component of magnetic recording medium 72. For example, measurement system 70 may be used to measure the compressibility ratio of underlayer 78 before magnetic layer 80 is applied. Similar to the process described above, underlayer 78 may be sandwiched between substantially incompressible rollers 74. Underlayer 78 will then compress as rollers 74 apply a uniform force to the underlayer. The quotient of compressed thickness to uncompressed thickness of underlayer 78 is the compressibility ratio of the underlayer. As discussed, an underlayer according to this disclosure may be highly compressible. When an average force of approximately 2500 pounds per linear inch is applied between rollers 74 in measurement system 70, an underlayer constructed in accordance with this disclosure may exhibit an underlayer compressibility ratio greater than or equal to approximately 10%, such as greater than or equal to approximately 14%, or greater than or equal to approximately 17%.

Figure 6:
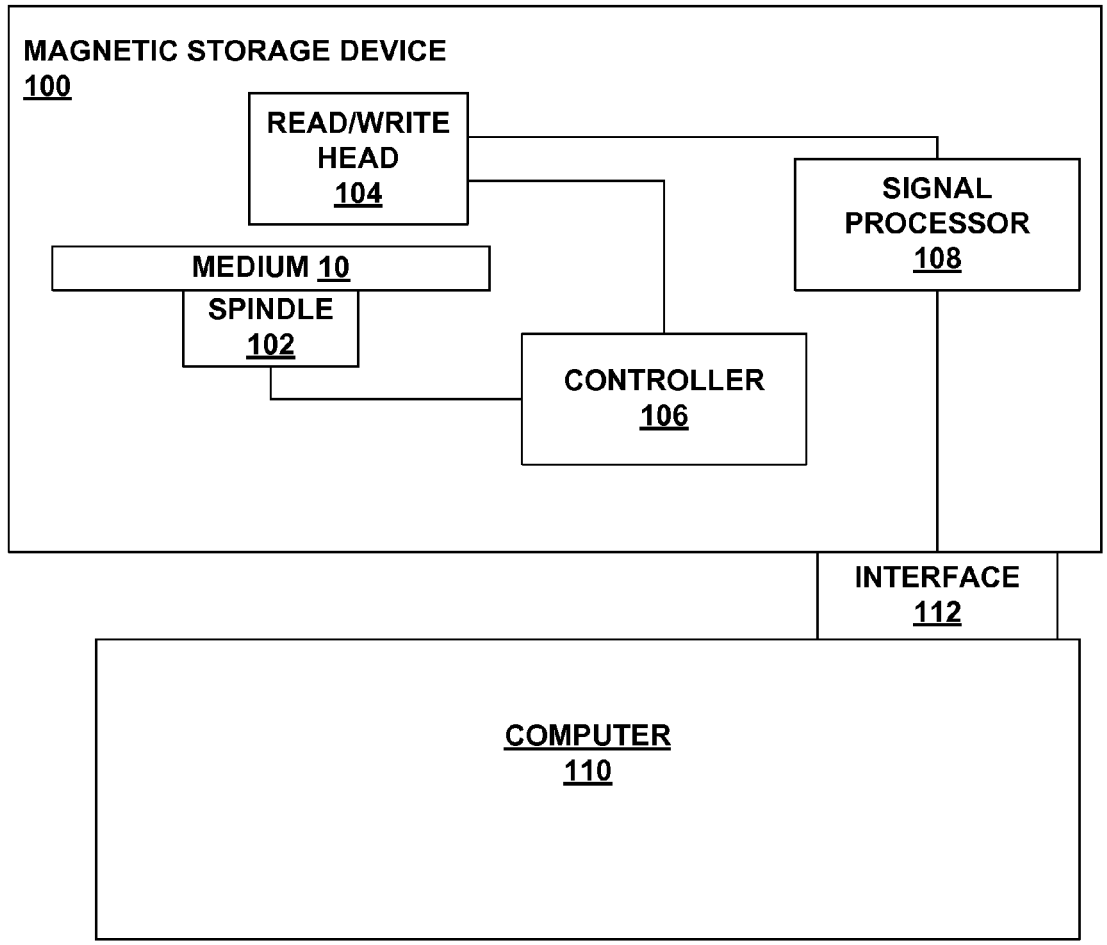
FIG. 6 is a block diagram of a magnetic storage system that may employ a magnetic recording medium.
Figure 7:
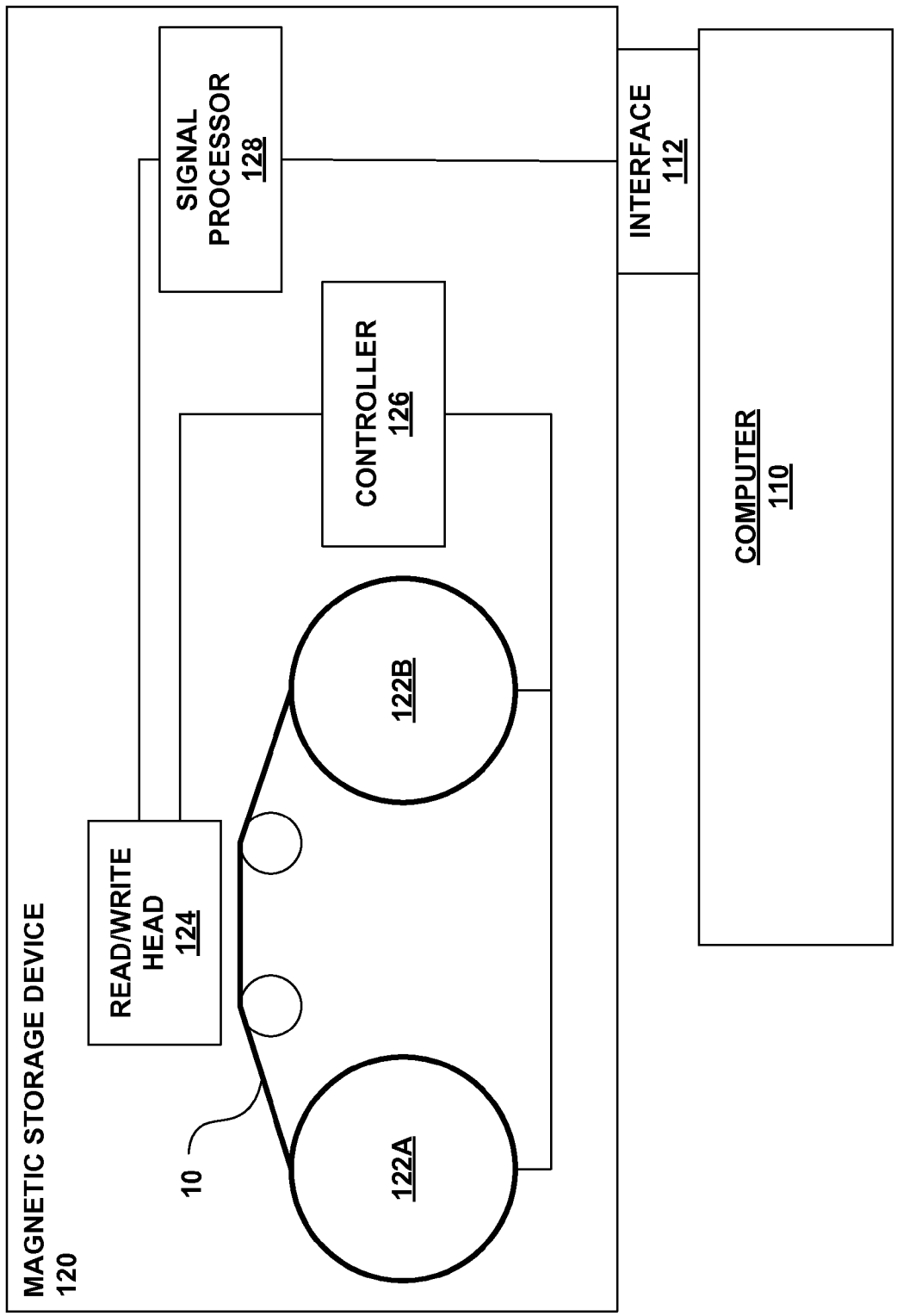
FIG. 7 is a block diagram of another exemplary magnetic storage system that may employ a magnetic recording medium.

FIGS. 6 and 7 are block diagrams of exemplary magnetic storage devices that may be used to read or record data on medium described herein. As shown in FIG. 6, magnetic storage device 100 may be used with a disk shaped configuration of magnetic recording medium 10. In that case, magnetic storage device 100 may comprise a magnetic disk drive, a hard disk drive, a floppy disk drive, or the like. The magnetic recording medium 10 may include a substrate, a highly compressible underlayer, and a magnetic layer with a polyhydric binder that exhibits good durability loss formed over the underlayer. Spindle 102 may be used to spin medium 10 and read/write head 104 may be positioned to detect magnetic domains on medium 10. A controller 106 controls spindle 102 and read/write head 104 to precisely position read write head 104 relative to medium 10. Signal processor 108 interprets detected magnetic domains.

As illustrated in FIG. 6, magnetic storage device 100 may be coupled to a computer 110 via an interface 112. For example, computer 110 may comprise a central processing unit for any of a variety of computer devices, including, for example, a PC, a Macintosh, a computer workstation, a handheld data terminal, a palm computer, a cell phone, digital paper, a digital television, a wireless device (in which case interface 112 may be wireless), a personal digital assistant, a laptop computer, a desktop computer, a digital camera, a digital recording device, or the like.

As shown in FIG. 7, magnetic storage device 120 may be used with a configuration of magnetic recording medium 10 that includes magnetic tape. In that case, magnetic storage device 120 may comprise a magnetic tape drive, a magnetic tape cartridge drive, or the like. Medium 10 may include magnetic tape spooled onto one or more spools 122A and 122B. Spools 122 may be housed in a cartridge, although the invention is not limited in that respect. The magnetic recording medium 10 in the form of magnetic tape may include a substrate, a highly compressible underlayer, and a magnetic layer with a polyhydric binder that exhibits good durability loss formed over the underlayer. Read/write head 124 may be positioned to detect magnetic domains on medium 10. A controller 126 controls the positioning of read/write head 124 as well as the movement of medium 10 such as by turning spools 122A and/or 122B to precisely position read/write head 124 relative to medium 10. A signal processor 128 interprets detected magnetic domains.

Like in FIG. 6, magnetic storage device 120 of FIG. 7 may be coupled to a computer 110 via an interface 112. Again, computer 110 may comprise a central processing unit for any of a variety of computer devices, including, for example, a PC, a Macintosh, a computer workstation, a hand-held data terminal, a palm computer, a cell phone, digital paper, a digital television, a wireless device, a personal digital assistant, a laptop computer, a desktop computer, a digital camera, a digital recording device, or the like.

Beyond the devices illustrated in FIGS. 6 and 7, magnetic recording medium 10 may be configured to function with other types of storage devices. For example, magnetic recording medium 10 can be configured for use in high density recording applications, such as for use with T10000, LTO3, LTO4, LTO5, Quantum S5, Quantum S6, 3592, or other suitably designed magnetic recording tape drives. As a particular example, magnetic recording medium 10 may be provided in an LTO4 or LTO5 tape cartridge.

Although the magnetic recording medium described and illustrated herein generally included a backing layer, a substrate, an underlayer, and a magnetic layer, it should be appreciated that one or more layers may be added or removed from the described structures without departing from the scope of this disclosure. As an example, particular layers described may in fact be formed from a plurality of layers. For instance, a magnetic recording medium may include multiple substrate layers, multiple underlayers, multiple magnetic layers, or combinations thereof.

The following examples may provide additional details about magnetic recording medium formed in accordance with this disclosure.

EXAMPLES

Example 1

Four magnetic particle dispersions were prepared using the materials and techniques outlined above. The dispersions served as control formulations to test different magnetic particle oxide passivation layers. As a result, each dispersion was chemically identical except for an oxide passivation layer thickness that covered magnetic particles in the dispersion. Two control samples of gamma-ferric oxide with an average oxide passivation layer thickness of 2.42 nm were obtained from Dowa Holdings Co., Ltd (Japan) under the name HM193. Two additional samples of gamma-ferric oxide with an average oxide passivation layer thickness of 2.27 nm were obtained from Dowa Holdings Co., Ltd. The additional samples were sold under the name DA200. The four dispersions were identically coated, magnetically oriented, and calendered. The magnetic recording media exhibited the characteristics indicated in Table 1 below.

TABLE 1

|  | Magnetic Particle Pigment | Hc (Oersted) | $Mr*t$ (memu/cm2) | $Ms*t$ (memu/cm2) | Squareness $(Mr*t/Ms*t)$ | SFD | Orientation Ratio |
| --- | --- | --- | --- | --- | --- | --- | --- |
| Control 1 | HM 193 | 2696 | 1.67 | 2.00 | 0.837 | 0.51 | 2.47 |
| Test 1 | DA 200 | 2636 | 1.75 | 2.1 | 0.834 | 0.46 | 2.37 |
| Control 2 | HM 193 | 2649 | 1.65 | 2.05 | 0.804 | 0.54 | 2.24 |
| Test 2 | DA 200 | 2641 | 1.85 | 2.31 | 0.803 | 0.46 | 2.32 |

In Table 1, $H_c$ refers to the measured coercivity of the magnetic layer, where coercivity refers to the magnetic field strength needed to reverse a given magnetization. The column Mr*t refers to the remnant magnetization-thickness product, which is discussed above in relation to magnetic recording medium 10. The column Ms*t refers to the saturated (e.g., 10,000 Oersted) magnetization-thickness product. Using data from the two previous columns, squareness is also presented in Table 1 as the ratio of remnant magnetization-thickness product to saturated magnetization-thickness product. Table 1 also includes switching field distribution (SFD) data, which refers to the interval of magnetic field strength over which a given magnetization can be completely reversed. Finally, Table 1 provides orientation ratio data that were measured according to the description provided above.

As shown in Table 1, magnetic recording mediums in Test 1 and Test 2 exhibited higher remnant magnetization-thickness products and higher saturated magnetization-thickness products as compared to control samples 1 and 2. The higher values reflect thinner oxide passivation layer thicknesses on the test samples. The control samples and test samples above were chosen from a plurality of data because squareness and orientation ratios for corresponding samples are similar, providing a uniform basis for comparison. As shown in Table 1, remnant magnetization-thickness product and saturated magnetization-thickness products amplitude increased for Test samples 1 and 2, which indicates improved electromagnetic performance. Subsequent testing revealed that magnetic recording mediums comprising magnetic particles with reduced oxide passivation layer thicknesses exhibit broadband signal-to-noise ratio improvements of approximately +0.25 decibels to approximately +0.50 decibels as compared to magnetic recording mediums comprising magnetic particles with standard or thicker oxide passivation layer thicknesses.

Formulation Data for Examples 2-6

Two different types of magnetic recording media were constructed for testing in the following five examples. A first type of magnetic recording media was constructed in accordance with the materials and formulations identified in this disclosure. In the tables and descriptions presented below, these samples are labeled as "Gen5" samples. For comparison purposes, a second type of magnetic recording media was constructed based on industry standard materials and formulations. The samples of the industry standard magnetic recording medium are labeled as "Gen4" in the tables and descriptions below.

The Gen4 and Gen5 samples were created using identical processing techniques. As a result, the only difference between the Gen4 and Gen5 samples were the chemical composition of the underlayers and magnetic layers of the respective Gen4 and Gen5 magnetic recording media. The different formulations are identified in Table 2 and Table 3 below. Table 2 illustrates respective underlayer formulations for Gen4 and Gen5 magnetic recording media samples. Table 3 illustrates respective magnetic layer formulations for Gen4 and Gen5 magnetic recording media samples.

TABLE 2

Underlayer Formulations

| Component | Gen5 Weight % | Gen4 Weight % |
|---|---|---|
| Iron Oxide Pigment | 60-66 | 68-74 |
| Acid Surface Modifier | 1-3 | 0-2 |
| Conductive Carbon | 10-15 | 3-5 |
| Carbon Dispersant Binder | 2.5-4 | 0 |
| Alumina | 0 | 2-5 |
| Binder 1 (e.g. Vinyl Chloride) | 6-9 | 7-9 |
| Binder 2 (e.g. Urethane) | 4-6 | 5-7 |
| Isocyanate Activator | 2-3 | 2-3 |
| Acid Lubricant | 2-3 | 2-3.5 |
| Ester Lubricant | 0.5-1.5 | 0.5-2 |
| Amide Lubricant | 0.1-0.2 | 0 |

TABLE 3

Magnetic Layer Formulations

| Component | Gen5 Weight % | Gen4 Weight % |
|---|---|---|
| Magnetic Pigment | 67-73 | 67-73 |
| Acid Surface Modifier | 2.5-3.5 | 1.5-2.5 |
| Carbon | 0.5-0.9 | 0.5-0.9 |
| Alumina | 6-8 | 7-9.5 |
| Large Alumina (>200 nm) | 1-3 | 0 |
| Binder 1 (e.g. Vinyl Chloride) | 6-8 | 9-11 |
| Binder 2 (e.g. Urethane) | 4-6 | 4-6 |
| Binder 3 (e.g. Poly(vinyl acetal)) | 0.5-1.2 | 0 |
| Isocyanate Activator | 2-3 | 1.5-2.5 |
| Acid Lubricant | 0.5-1.5 | 0.5-1.5 |
| Ester Lubricant | 0.5-1.5 | 0.5-1.5 |

As noted, magnetic recording media were created according to the formulation ranges identified in Tables 2 and 3. The magnetic recording media were then tested and evaluated.

Example 2

Based on Formulation Data Above

Magnetic recording media created from the Gen4 and Gen5 formulations listed above were subject to two-pass durability loss testing. Different test samples were created using identical processing parameters. As a result, only two parameters varied among different test samples. First, samples varied chemically according to the Gen4 and Gen5 compositional differences noted above. Second, different underlayer thicknesses were deposited for different samples within each chemical class.

The two-pass durability loss test used in testing was the same test described in relation to FIG. 4 above. As described, the durability loss test is a specific implementation of the abrasivity loss test provided in section 9.12 of industry standard EMCA-319, as promulgated in June 2001. According to the standard, a test piece of magnetic recording tape 580 m in length is passed for 100 passes (50 cycles) over a rectangular bar of Alfesil. The bar is approximately 4.5 mm square and at least 18 mm long. The magnetic recording tape is traversed across that bar at a speed of 3.0 m/s, under a tension of 1.0 Newtons, and at a wrap angle of 12 degrees. According to the durability loss test, the EMCA-319 test is performed a first time on a first piece of magnetic tape, the Alfesil bar is replaced with a new bar, and the test is repeated a second time on the same piece of magnetic tape, resulting in 200 passes (100 cycles) for the same piece of magnetic recording tape. Magnetic recording tapes formed from the Gen4 formulations identified above exhibited durability loss as indicated in Table 4. Magnetic recording tapes formed from the Gen5 formulations identified above exhibited the durability loss data as indicated in Table 5.

TABLE 4

| Prd | LTO Cartridge Abrasivity - 1st 100 passes (micrometers) | LTO Cartridge Abrasivity - 2nd 100 passes (micrometers) | Difference Between 1st and 2nd 100 passes (micrometers) | Abrasivity Loss from 1st to 2nd 100 passes |
|---|---|---|---|---|
| Gen4 | 24.8 | 22.9 | 1.9 | 7.8% |
| Gen4 | 25.8 | 26.3 | −0.5 | −1.9% |
| Gen4 | 27.3 | 21.9 | 5.4 | 19.6% |
| Gen4 | 23.9 | 19.5 | 4.4 | 18.4% |
| Gen4 | 22.4 | 21.9 | 0.5 | 2.2% |
| Gen4 | 27.7 | 25.3 | 2.4 | 8.8% |
| Gen4 | 25.8 | 23.4 | 2.4 | 9.4% |
| Gen4 | 42.8 | 31.6 | 11.2 | 26.1% |
| Gen4 | 41.4 | 36.0 | 5.4 | 12.9% |
| Gen4 | 37.5 | 28.2 | 9.2 | 24.7% |
| Gen4 | 32.6 | 20.4 | 12.2 | 37.4% |
| Gen4 | 23.9 | 21.4 | 2.5 | 10.5% |
| Gen4 | 23.9 | 20.4 | 3.5 | 14.6% |
| Gen4 Average | 29.2 | 24.6 | 4.7 | 14.7% |

TABLE 5

| Prd | LTO Cartridge Abrasivity - 1st 100 passes (micrometers) | LTO Cartridge Abrasivity - 2nd 100 passes (micrometers) | Difference Between 1st and 2nd 100 passes (micrometers) | Abrasivity Loss from 1st to 2nd 100 passes |
|---|---|---|---|---|
| Gen5 | 28.2 | 26.3 | 1.9 | 6.9% |
| Gen5 | 26.3 | 24.8 | 1.5 | 5.6% |
| Gen5 | 29.2 | 29.2 | 0.0 | 0.0% |
| Gen5 | 27.7 | 26.3 | 1.5 | 5.3% |
| Gen5 | 29.7 | 26.3 | 3.4 | 11.5% |
| Gen5 | 23.9 | 24.3 | −0.5 | −2.0% |
| Gen5 | 23.4 | 22.9 | 0.5 | 2.1% |
| Gen5 | 29.7 | 27.7 | 1.9 | 6.6% |
| Gen5 | 30.2 | 28.2 | 1.9 | 6.5% |
| Gen5 | 26.3 | 24.8 | 1.5 | 5.6% |
| Gen5 | 28.2 | 27.3 | 1.0 | 3.4% |
| Gen5 | 28.2 | 27.3 | 1.0 | 3.4% |
| Gen5 | 30.7 | 29.2 | 1.5 | 4.8% |
| Gen5 | 23.4 | 23.4 | 0.0 | 0.0% |
| Gen5 | 29.7 | 28.7 | 1.0 | 3.3% |
| Gen5 | 28.7 | 24.3 | 4.4 | 15.3% |
| Gen5 Average | 27.7 | 26.3 | 1.4 | 4.9% |

As seen above, magnetic recording media formed from Gen4 chemical formulations exhibited an average two-pass abrasivity loss of 4.7 micrometers. By contrast, magnetic recording media formed from Gen5 chemical formulations exhibited an average two-pass abrasivity loss of 1.4 micrometers. Reduced abrasivity loss between repeated passes indicates that Gen5 recording media maintain abrasivity better than Gen4 media when repeatedly contacted by an object. In operation, the object may be a magnetic recording head that repeatedly contacts the surface of a media. As a result, the test indicates that a Gen5 magnetic recording medium may be more durable than a Gen4 magnetic recording medium.

Example 3

Based on Formulation Data Above

In this Example, two different types of underlayers were subject to compressibility testing. The two different types of underlayers were created from the Gen4 and Gen5 underlayer formulations listed above. Unlike Example 2, which employed full Gen4 and Gen5 magnetic recording media, this Example focused on different magnetic recording media underlayers. The compressibility test used in testing was the same test described above in relation to FIG. 5.

Test articles were constructed by coating an underlayer formulation over a substantially incompressible polymeric substrate. The polymeric substrate was a 20 gauge (5,000 nanometer) polyethylene naphthalate film. The underlayer formulation was deposited to achieve different dried underlayer thickness for different samples. Underlayer thicknesses of 50 microinches, 40 microinches, 30 microinches, and 20 microinches were prepared. Finally, the coated article was dried to solidify and crosslink the underlayer coating.

The dried article, comprising a single substrate layer and a single underlayer deposited directly on the substrate layer, was repeatedly folded to create a folded stack comprising eight substrate layers and eight underlayers. The thickness of the eight layer stack was measured using a Pratt & Whitney Laserule, and the eight layer stack was then calendered. The calendering apparatus was a vertical four nip station stack of steel-on-steel rolls closed with an average force of 2585 pounds per linear inch inn each nip. The rolls were heated to approximately 150 degrees Celsius. After calendering, the thickness of the eight layer stack was again measured using the Pratt & Whitney Laserule. The thickness of the uncalendered stack was compared to the calendered stack and divided by eight to arrive at compressibility ratios for different underlayer formulations. Compressibility ratios were averaged across repeated samples and different thicknesses within the particular category of underlayer material.

Underlayers created using the Gen5 formulation exhibited an average compressibility ratio of 18.4 percent. By contrast, underlayers created used the Gen4 formulations exhibited an average compressibility ratio of 8.8 percent.

Example 4

Based on Formulation Data Above

In this Example, underlayers prepared from Gen4 and Gen5 formulations were subject to surface roughness testing. Underlayers of different thicknesses and different compositions were prepared similar to Example 4. The test articles were constructed by coating an underlayer formulation over a substantially incompressible polymeric substrate. The polymeric substrate was a 20 gauge (5,000 nanometer) polyethylene naphthalate film. The underlayer formulation was deposited to achieve different dried underlayer thickness for different samples. Underlayer thicknesses of 50 microinches, 40 microinches, 30 microinches, and 20 microinches were prepared. Finally, the coated article was dried to solidify and crosslink the underlayer coatings.

The surface roughness of the coating surface defined by the underlayer samples was determined using a NanoScope IIIa instrument manufactured by Digital Instruments. The instrument employed a Veeco Model NP-S20 probe with a 100 square micrometers scansize operating in contact mode. The scan rate was 3.39 hertz, and the probe tip velocity was 678 micrometers/second.

Surface roughness measurements were taken on uncalendered test articles and identically prepared calendered test articles using the apparatus described above. The calendered test articles were calendered using the method described in Example 4, including the eight-layer and the four nip calendering station. Uncalendered samples exhibited the characteristics indicated in Table 6 below. Calendered samples exhibited the characteristics indicated in Table 7 below. The percentage of surface roughness change between uncalendered and calendered samples are indicated in Table 8 below.

TABLE 6

Uncalendered Samples

| Measurement | Rq (nm) | Ra (nm) | Skew. | Kurt. | Rpm (nm) | Bearing Analysis Wyko Software | | | |
|---|---|---|---|---|---|---|---|---|---|
| | | | | | | RK (nm) | Rpk (nm) | Rvk (nm) | Rz (nm) |
| Gen5 (50 microinch underlayer) | 9.0 | 7.2 | 0.04 | 3.4 | 87 | 23 | 9.3 | 8.8 | 112 |
| Gen5 (40 microinch underlayer) | 8.1 | 6.4 | 0.19 | 3.8 | 70 | 21 | 9.0 | 7.5 | 107 |
| Gen5 (30 microinch underlayer) | 8.9 | 7.1 | 0.21 | 3.6 | 97 | 23 | 9.6 | 7.9 | 98 |
| Gen5 (20 microinch underlayer) | 9.3 | 7.4 | 0.28 | 3.7 | 65 | 24 | 10.9 | 8.3 | 113 |
| Gen5 Average | 8.8 | 7.0 | 0.2 | 3.6 | 79.7 | 22.7 | 9.7 | 8.1 | 107.7 |
| Gen4 (40 microinch underlayer) | 12.6 | 10.0 | 0.02 | 3.3 | 88 | 33 | 12.6 | 11.9 | 130 |
| Gen4 (30 microinch underlayer) | 13.2 | 10.5 | 0.09 | 3.1 | 91 | 35 | 13.5 | 11.8 | 120 |
| Gen4 (20 microinch underlayer) | 13.8 | 10.9 | 0.22 | 3.3 | 94 | 36 | 15.3 | 11.6 | 133 |
| Gen4 Average | 13.17 | 10.48 | 0.11 | 3.22 | 90.90 | 34.33 | 13.77 | 11.77 | 127.38 |

TABLE 7

Calendered Samples

| Measurement | Rq (nm) | Ra (nm) | Skew. | Kurt. | Rpm (nm) | Bearing Analysis Wyko Software | | | |
|---|---|---|---|---|---|---|---|---|---|
| | | | | | | RK (nm) | Rpk (nm) | Rvk (nm) | Rz (nm) |
| Gen5 Cal (40 microinch underlayer) | 3.7 | 2.9 | 0.44 | 5.4 | 39 | 9 | 5.1 | 3.5 | 63 |
| Gen5 Cal (30 microinch underlayer) | 4.0 | 3.1 | 0.74 | 5.5 | 61 | 9 | 5.7 | 3.1 | 51 |
| Gen5 Cal (20 microinch underlayer) | 4.7 | 3.6 | 0.59 | 4.1 | 34 | 11 | 6.5 | 3.5 | 47 |
| Average Gen5 | 4.1 | 3.2 | 0.6 | 5.0 | 45.0 | 9.9 | 5.7 | 3.4 | 53.7 |
| Gen4 Cal (50 microinch underlayer) | 6.3 | 4.9 | 0.53 | 4.8 | 65 | 15 | 8.7 | 5.2 | 81 |
| Gen4 Cal (40 microinch underlayer) | 6.3 | 4.9 | 0.5 | 6.5 | 114 | 15 | 9.1 | 5.5 | 110 |
| Gen4 Cal (30 microinch underlayer) | 6.7 | 5.2 | 0.6 | 4.3 | 70 | 16 | 9.3 | 5.2 | 85 |
| Gen4 Cal (20 microinch underlayer) | 6.9 | 5.4 | 0.59 | 4.4 | 83 | 17 | 9.6 | 5.4 | 83 |
| Average Gen4 | 6.5 | 5.1 | 0.6 | 5.0 | 82.9 | 15.9 | 9.2 | 5.3 | 89.6 |

TABLE 8

Percent Decrease After Calendering

|  | Rq (nm) | Ra (nm) | Rpm (nm) | RK (nm) | Rpk (nm) | Rvk (nm) | Rz (nm) |
|---|---|---|---|---|---|---|---|
| Gen5 (40 microinch underlayer) | 54.3% | 55.2% | 44.2% | 56.6% | 44.0% | 53.7% | 41.1% |
| Gen5 (30 microinch underlayer) | 55.4% | 56.7% | 36.5% | 59.0% | 40.9% | 61.2% | 47.8% |
| Gen5 (20 microinch underlayer) | 49.8% | 50.5% | 47.1% | 52.3% | 40.5% | 57.5% | 58.6% |
| Gen5 Average Change | 53.2% | 54.2% | 42.6% | 56.0% | 41.8% | 57.5% | 49.2% |
| Gen4 (40 microinch underlayer) | 50.0% | 51.4% | −29.1% | 53.8% | 27.5% | 54.1% | 15.5% |
| Gen4 (30 microinch underlayer) | 49.6% | 50.8% | 22.6% | 52.8% | 30.7% | 56.0% | 28.6% |
| Gen4 (20 microinch underlayer) | 49.9% | 51.0% | 11.4% | 52.8% | 37.4% | 53.5% | 37.8% |
| Gen4 Average Change | 49.8% | 51.1% | 1.7% | 53.1% | 31.9% | 54.5% | 27.3% |

In Tables 6, 7, and 8, surface roughness is quantified as root mean square surface roughness (Rq) and average surface roughness (Ra). Skewness, or lack of symmetry in the roughness data, is captured in the column labeled skew. The kurtosis column indicates whether a data distribution is peaked or flat relative to a normal distribution. In addition, the tables indicate roughness depth (Rz) and surface roughness relative to center line average height (Rpm).

As shown in Table 6, uncalendered Gen5 underlayers exhibited an average surface roughness (Ra) of 7.0 and an average roughness depth (Rz) of 107.7, while uncalendered Gen4 underlayers exhibited an average surface roughness (Ra) of 10.5 and an average roughness depth (Rz) of 127.4. As further shown in Table 7, calendered Gen5 underlayers exhibited an average surface roughness (Ra) of 3.2 and an average roughness depth (Rz) of 53.7, while calendered Gen4 underlayers exhibited an average surface roughness (Ra) of 5.1 and an average roughness depth (Rz) of 89.6. According to these data, average surface roughness changed by an average of 54.2 percent and average roughness depth by an average of 49.2 percent after calendering for Gen5 samples, while average surface roughness and average roughness depth only changed an average of 51.1 percent and 27.3 percent, respectively, after calendering for Gen4 samples. The enhanced benefits of calendering for Gen5 samples may be attributable to additional compressibility of Gen5 samples, as noted above.

Example 5

(Based on Formulation Data Above) Test Results

In this Example, two different magnetic recording media were prepared for processing and surface roughness characterization. The first magnetic recording medium was a control Gen4 sample prepared according to the formulation tables provided above. The second test magnetic recording medium was prepared according to the Gen5 formulation tables provided above.

The two samples were processed using similar processing parameters and similar processing equipment. As a result, the two samples only varied based on chemical composition, as noted above, and underlayer thickness, as noted in Table 9. The samples were formed and subject to in-line calendering and off-line calendering using steel-on-steel rollers according to parameters indicated in Table 9 below. Afterward, the average surface roughness (Ra) of the magnetic recording surface of each sample was measured using an atomic force microscope. These data are indicated in Table 9.

TABLE 9

| Sample | In-line Calendering Speed (feet/min) | In-line Calendering Pressure (psi) | Underlayer Thickness (microinches) | Off-line Calendering Speed (feet/min) | Off-line Calendering Pressure (psi) | Exemplary Ra Values (nanometers) |
|---|---|---|---|---|---|---|
| Gen4 | 800 | 1529 | 38 | 700 | 3714 | 3.6 |
| Gen5 | 1000 | 483 | 32 | 700 | 3714 | 2.9 |

The data in Table 9 indicate that a magnetic recording medium constructed according to this disclosure may exhibit less surface roughness than a comparable industry standard (Gen4) recording medium. Average surface roughness may be reduced even when using a reduced thickness underlayer and/or when subjecting the magnetic recording medium to reduced calendering forces.

Example 6

Partially Based on Formulation Data Above

In this Example, different magnetic recording media were prepared to test various advantages of a polyhydric binder. Magnetic recording media samples were prepared based on the Gen4 formulations identified above. However, as noted below in Table 10, some samples included a poly (vinyl acetal) binder in underlayer formulation, magnetic layer formulation, or both the magnetic layer formulation and the underlayer formulation. After coating and drying, the various samples were subject to Fourier Transform Infrared (FTIR) Spectroscopy to identify residual activator isocyanate in the respective layers. The data from the testing are indicated in Table 10 below.

TABLE 10

| | | | | FTIR, Residual Isocyanate | | Abrasivity (nm) | |
|---|---|---|---|---|---|---|---|
| Sample | Underlayer Formulation | Magnetic Layer Formulation | Glass Transition Temperature (Tg) Celsius | Recording Surface of Magnetic Layer | Backside of Underlayer Opposite Magnetic Layer | LTO Cartridge Abrasivity - 1st 100 passes (micrometers) | LTO Cartridge Abrasivity - 2nd 100 passes (micrometers) |
| 1 | Standard | Standard | 66.4 | | | 28.2 | 23.4 |
| 2 | Standard | Polyhydric | 68.1 | | | 32.1 | 24.8 |
| 3 | Polyhydric | Standard | 67.9 | | | 24.3 | 21.4 |
| 4 | Polyhydric | Polyhydric | 68.2 | | | 26.8 | 26.3 |
| 5 | Standard | Standard | 65.8 | 0.198 | 0.117 | | |
| 6 | Standard | Polyhydric | 67.2 | 0.157 | 0.08 | | |
| 7 | Polyhydric | Standard | 65.1 | 0.16 | | | |
| 8 | Polyhydric | Polyhydric | 67.4 | 0.072 | | | |

As indicated in Table 10, residual isocyanate at the recording surface of the magnetic recording medium that included poly(vinyl acetal) in both the underlayer formulation and the magnetic layer formulation was less than half the amount of residual isocyanate in the magnetic recording medium that did not include poly(vinyl acetal) in either the magnetic layer or the underlayer formulations (i.e., 0.072 versus 0.198, respectively).

Various embodiments of the invention have been described. These and other embodiments are within the scope of the following claims.

The invention claimed is:

1. A magnetic recording medium comprising:
   a substrate;
   an underlayer formed over the substrate, the underlayer defining a coating surface and comprising a non-magnetic metal oxide pigment having an average pigment particle size of between about 35 to 100 nanometers and making up between about 55 to 75 weight percent of the underlayer, and further comprising about 10 to 25 weight parts of carbon black per 100 weight parts of non-magnetic metal oxide pigment; and
   a magnetic layer formed over the coating surface of the underlayer, and comprising abrasive particles having an average major axis length of more than 3.05 times greater, and up to approximately 5 times greater, than the thickness of the magnetic layer;
   wherein the underlayer defines an average thickness less than or equal to approximately 890 nanometers; and
   wherein an average surface roughness (Ra) of the underlayer after calendering is less than or equal to approximately 3.6 nanometers, and an average surface roughness depth (Rz) of the underlayer decreases by greater than or equal to approximately 40 percent after calendering.

2. The magnetic recording medium of claim 1, wherein the underlayer defines an average thickness greater than or equal to approximately 380 nanometers, and the substrate defines an average thickness greater than or equal to approximately 4000 nanometers and less than or equal to approximately 6000 nanometers.

3. The magnetic recording medium of claim 2, wherein the underlayer defines an average thickness between approximately 710 nanometers and approximately 813 nanometers, and the substrate defines an average thickness between approximately 4750 nanometers and approximately 5250 nanometers.

4. The magnetic recording medium of claim 1, wherein the ratio of carbon black weight parts to nonmagnetic metal oxide pigment weight parts is less than or equal to approximately 0.25, and wherein the magnetic layer further comprises an activator and a polyhydric binder that includes at least six hydroxyl functional groups.

5. The magnetic recording medium of claim 1, wherein the magnetic layer comprises an activator and a polyhydric binder that includes at least 98 hydroxyl functional groups.

6. The magnetic recording medium of claim 5, wherein the activator includes an isocyanate functional group, the polyhydric binder includes a poly(vinyl acetal) binder, and the magnetic layer further comprises a urethane binder and a vinyl chloride binder.

7. The magnetic recording medium of claim 6, wherein the magnetic layer comprises a plurality of metal particles with an average longitudinal length for each particle of the plurality of metal particles less than or equal to approximately 40 nanometers.

8. The magnetic recording medium of claim 1, wherein an average compressibility ratio of the underlayer is greater than or equal to approximately 14 percent.

9. The magnetic recording medium of claim 8, wherein the magnetic recording medium exhibits an average two-pass abrasivity loss of less than or equal to approximately 2.5 micrometers.

10. The magnetic recording medium of claim 9, wherein the average compressibility ratio of the underlayer is less than or equal to approximately 20 percent, the average surface roughness (Ra) of the underlayer is greater than or equal to approximately 1.1 nanometers, and the magnetic recording medium exhibits a two-pass abrasivity loss greater than or equal to approximately 0.25 micrometers.

11. A magnetic recording medium comprising:
a substrate;
an underlayer formed over the substrate, the underlayer defining a coating surface and comprising a non-magnetic metal oxide pigment having an average pigment particle size of between about 35 to 100 nanometers and making up between about 55 to 75 weight percent of the underlayer, and further comprising about 10 to 25 weight parts of carbon black per 100 weight parts of non-magnetic metal oxide pigment; and
a magnetic layer formed over the coating surface of the underlayer, and comprising abrasive particles having an average major axis length of more than 3.1 times greater, and up to approximately 5 times greater, than the thickness of the magnetic layer;
wherein the underlayer defines an average thickness less than or equal to approximately 890 nanometers; and
wherein an average surface roughness (Ra) of the underlayer after calendering is less than or equal to approximately 3.6 nanometers, and an average surface roughness depth (Rz) of the underlayer decreases by greater than or equal to approximately 40 percent after calendering.

12. The magnetic recording medium of claim 11, wherein the underlayer defines an average thickness greater than or equal to approximately 380 nanometers, and the substrate defines an average thickness greater than or equal to approximately 4000 nanometers and less than or equal to approximately 6000 nanometers.

13. The magnetic recording medium of claim 12, wherein the underlayer defines an average thickness between approximately 710 nanometers and approximately 813 nanometers, and the substrate defines an average thickness between approximately 4750 nanometers and approximately 5250 nanometers.

14. The magnetic recording medium of claim 11, wherein the ratio of carbon black weight parts to nonmagnetic metal oxide pigment weight parts is less than or equal to approximately 0.25, and wherein the magnetic layer further comprises an activator and a polyhydric binder that includes at least six hydroxyl functional groups.

15. The magnetic recording medium of claim 11, wherein the magnetic layer comprises an activator and a polyhydric binder that includes at least 98 hydroxyl functional groups.

16. The magnetic recording medium of claim 15, wherein the activator includes an isocyanate functional group, the polyhydric binder includes a poly(vinyl acetal) binder, and the magnetic layer further comprises a urethane binder and a vinyl chloride binder.

17. The magnetic recording medium of claim 16, wherein the magnetic layer comprises a plurality of metal particles with an average longitudinal length for each particle of the plurality of metal particles less than or equal to approximately 40 nanometers.

18. The magnetic recording medium of claim 11, wherein an average compressibility ratio of the underlayer is greater than or equal to approximately 14 percent.

19. The magnetic recording medium of claim 18, wherein the magnetic recording medium exhibits an average two-pass abrasivity loss of less than or equal to approximately 2.5 micrometers.

20. The magnetic recording medium of claim 19, wherein the average compressibility ratio of the underlayer is less than or equal to approximately 20 percent, the average surface roughness (Ra) of the underlayer is greater than or equal to approximately 1.1 nanometers, and the magnetic recording medium exhibits a two-pass abrasivity loss greater than or equal to approximately 0.25 micrometers.

* * * * *